(12) United States Patent
Allen et al.

(10) Patent No.: US 10,208,943 B2
(45) Date of Patent: Feb. 19, 2019

(54) LAMPS FOR ENHANCED OPTICAL BRIGHTENING AND COLOR PREFERENCE

(71) Applicant: GE Lighting Solutions, LLC, East Cleveland, OH (US)

(72) Inventors: Gary Robert Allen, East Cleveland, OH (US); Dengke Cai, East Cleveland, OH (US); Mark Edward Kaminski, East Cleveland, OH (US); William Winder Beers, East Cleveland, OH (US); Thomas J. Boyle, East Cleveland, OH (US); Thomas Alexander Knapp, East Cleveland, OH (US); Karl Kristian Udris, East Cleveland, OH (US); Kevin James Vick, East Cleveland, OH (US); Thomas Clynne, East Cleveland, OH (US); Joshua Ian Rintamaki, East Cleveland, OH (US); Olivia Rae Vick, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/032,998

(22) PCT Filed: Oct. 28, 2014

(86) PCT No.: PCT/US2014/062758
§ 371 (c)(1),
(2) Date: Apr. 28, 2016

(87) PCT Pub. No.: WO2015/066099
PCT Pub. Date: May 7, 2015

(65) Prior Publication Data
US 2016/0290573 A1 Oct. 6, 2016

Related U.S. Application Data

(60) Provisional application No. 61/896,445, filed on Oct. 28, 2013.

(51) Int. Cl.
*F21K 99/00* (2016.01)
*F21V 19/00* (2006.01)
(Continued)

(52) U.S. Cl.
CPC .............. *F21V 29/70* (2015.01); *F21K 9/233* (2016.08); *F21K 9/56* (2013.01); *F21K 9/64* (2016.08);
(Continued)

(58) Field of Classification Search
CPC ........ F21V 29/70; F21V 19/0015; F21V 9/08; G02B 5/206; F21K 9/56; F21K 9/233; F21K 9/64; H05B 33/0857; F21Y 2101/02
See application file for complete search history.

(56) References Cited

U.S. PATENT DOCUMENTS 7,083,302 B2 * 8/2006 Chen .......................... F21K 9/00
257/89
7,453,195 B2 11/2008 Radkov
(Continued)

FOREIGN PATENT DOCUMENTS

| CN | 101657671 A | 2/2010 |
| WO | 2013069435 A1 | 5/2013 |
| WO | 2013101280 A2 | 7/2013 |

OTHER PUBLICATIONS

Unofficial English Translation of Chinese Office Action issued in connection with corresponding CN Application No. 201480059436.6 dated Mar. 27, 2017.
(Continued)

*Primary Examiner* — Tracie Y Green
(74) *Attorney, Agent, or Firm* — Peter T. DiMauro; GE Global Patent Operation

(57) ABSTRACT

In an embodiment, the disclosure provides a light source comprising at least one solid state light emitter. The light
(Continued)

source, in operation, emits substantially white light having a Lighting Preference Index (LPI) of at least about 105, and this emission from the light source comprises a UV-violet flux of at least about 1%. Use of the lamps, light sources, and methods of the present disclosure may afford the ability to display linens and clothing under energy-efficient LED-based illumination, and may impart an effect to (especially white) clothing, that makes them look cleaner than under illumination by prior art LED lamps.

17 Claims, 14 Drawing Sheets

(51) Int. Cl.
| | |
|---|---|
| *F21V 9/08* | (2018.01) |
| *F21V 29/70* | (2015.01) |
| *H05B 33/08* | (2006.01) |
| *F21K 9/233* | (2016.01) |
| *F21K 9/64* | (2016.01) |
| *G02B 5/20* | (2006.01) |
| *F21Y 101/02* | (2006.01) |

(52) U.S. Cl.
CPC .............. *F21V 9/08* (2013.01); *F21V 19/0015* (2013.01); *G02B 5/206* (2013.01); *H05B 33/0857* (2013.01); *F21Y 2101/02* (2013.01)

(56) References Cited

U.S. PATENT DOCUMENTS

| | | | |
|---|---|---|---|
| 2004/0104391 A1* | 6/2004 | Maeda | C09K 11/025 257/79 |
| 2005/0227388 A1* | 10/2005 | Setlur | C09K 11/665 438/22 |
| 2007/0258229 A1* | 11/2007 | Weaver | F21K 9/64 362/84 |
| 2008/0259589 A1 | 10/2008 | Van De Ven | |
| 2008/0265207 A1 | 10/2008 | Konrad et al. | |
| 2009/0129053 A1 | 5/2009 | Tsai | |
| 2010/0096998 A1 | 4/2010 | Beers | |
| 2011/0001422 A1* | 1/2011 | Aanegola | H01L 25/0753 313/501 |
| 2011/0062468 A1 | 3/2011 | Butterworth | |
| 2012/0098411 A1* | 4/2012 | Toth | C09K 11/7734 313/487 |
| 2012/0099303 A1* | 4/2012 | Li | H01L 25/0753 362/231 |
| 2012/0319617 A1* | 12/2012 | Yen | H05B 33/0863 315/294 |
| 2013/0114242 A1 | 5/2013 | Pickard et al. | |
| 2013/0313516 A1 | 11/2013 | David et al. | |
| 2014/0307417 A1 | 10/2014 | Yamakawa et al. | |
| 2015/0252953 A1* | 9/2015 | Progl | F21K 9/23 362/84 |
| 2016/0223146 A1* | 8/2016 | Vick | F21K 9/64 |
| 2017/0233649 A1* | 8/2017 | Vick | F21K 9/64 313/503 |
| 2018/0130928 A1* | 5/2018 | Vick | H01L 33/502 |

OTHER PUBLICATIONS

Vick et al., "Quantifying Consumer Lighting Preference", New Technology Introduction, pp. 1-6, 1975.
Mahy et al., "Evaluation of Uniform Color Spaces Developed after the Adoption of CIELAB and CIELUV", Color Research and Application, vol. No. 19, Issue No. 2, pp. 105-121, Apr. 1994.
Zukauskas et al., "Statistical Approach to Color Quality of Solid-State Lamps", IEEE Journal of Selected Topics in Quantum Electronics, vol. No. 15, Issue No. 6, pp. 1753-1762, Nov./Dec. 2009.
Ohno, "Color Quality Design for Solid State Lighting", LEDs, pp. 1-25, Oct. 11-12, 2012.
Derhak et al., "Analysis and Correction of the Joensuu Munsell Glossy Spectral Database", 20th Color and Imaging Conference Final Program and Proceedings, Society for Imaging Science and Technology, NY, USA, pp. 191-194, 2012.
Rea et al., "White Lighting", COLOR research and application, vol. No. 38, Issue No. 2, pp. 82-92, Apr. 2013.
Freyssinier et al., "Class a Color Designation for Light Sources Used in General Illumination", Journal of Light & Visual Environment, vol. No. 37, Issue No. 2 & 3, pp. 46-50, 2013.
Houser et al., "Review of measures for light-source color rendition and considerations for a two-measure system for a characterizing color rendition", Optics Express, vol. No. 21, Issue No. 8, pp. 10393-10411, 2013.
"Luxeon CoB with CrispWhite Technology", Philips Lumileds Lighting Company, Jul. 3, 2014.
International Search Report and Written Opinion issued in connection with related PCT Application No. PCT/US2014/054868 dated Dec. 16, 2014.
International Invitation to Pay Additional Fees issued in connection with corresponding PCT Application No. PCT/US2014/062758 dated Feb. 9, 2015.
International Search Report and Written Opinion issued in connection with corresponding PCT Application No. PCT/US2014/062758 dated May 18, 2015.

* cited by examiner

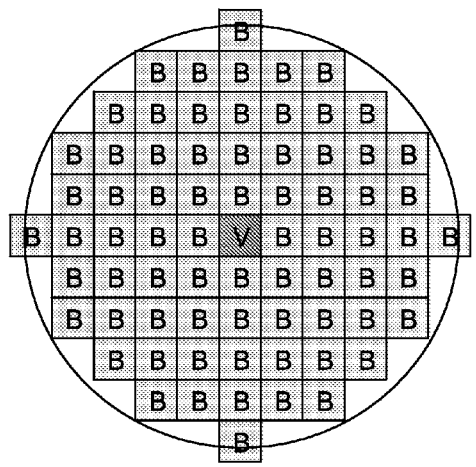 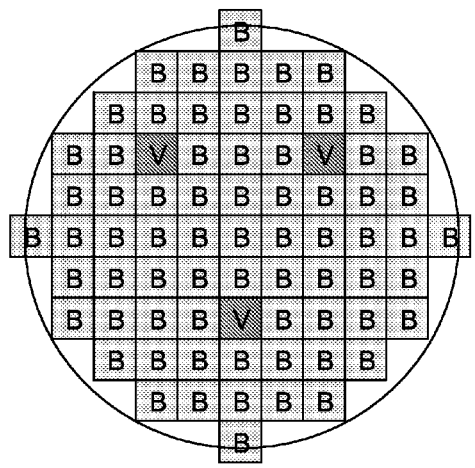
FIG. 10A             FIG. 10B
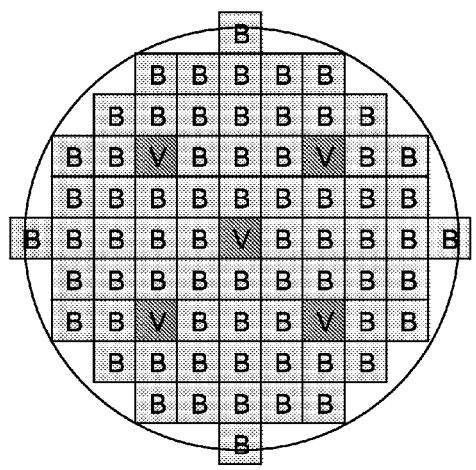 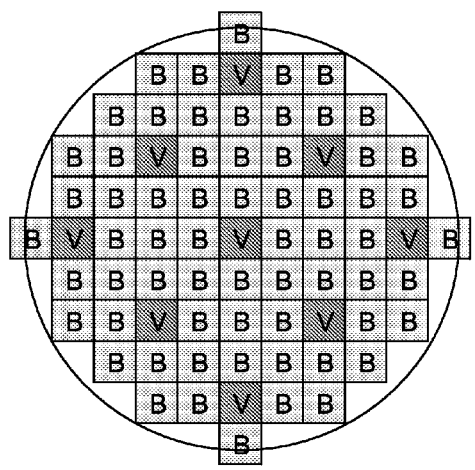
FIG. 10C             FIG. 10D

LAMPS FOR ENHANCED OPTICAL BRIGHTENING AND COLOR PREFERENCE

CROSS REFERENCE TO RELATED APPLICATIONS

This application is a national stage application under 35 U.S.C. § 371(c) of prior filed, co-pending PCT application serial number PCT/US2014/062758, filed on Oct. 28, 2014 which claims priority to a continuation-in-part of prior filed, copending, commonly-owned International Application PCT/US2014/054868, filed Sep. 9, 2014 and to commonly-owned provisional application 61/896,445, filed Oct. 28, 2013. These applications are hereby incorporated by reference as if set forth in their entirety herein.

FIELD

This invention relates to the illuminating arts, and in particular, to LED-based lamps and light sources.

BACKGROUND

Lamps and light sources for general illumination may take many forms. With respect to lighting used in retail settings (as well as for residential, hospitality, hospital, education, museums, and commercial lighting, etc.), lamps or light sources with high color rendering index (CRI) have historically been desired. Incandescent and halogen lamps have historically been the typical types of light sources used to provide the desired characteristics for such settings. In addition to, or instead of, high color rendering, some light sources may provide high color preference, whereby some or most colors have enhanced appearance compared with a reference illuminant (e.g., enhanced-color products of GE under the REVEAL® brand). The lamps and light sources may also provide directional illumination satisfying the desired beam distribution properties of the application. These historical light sources usually have fast warm-up and response time, high light intensity output, and have good color rendering or color preference characteristics, but may suffer from poor efficacy and relatively short lamp life. More recently developed high intensity discharge (HID) lamps, and especially ceramic metal halide (CMH) lamps, may offer much higher efficiency than the historical lamp types, with high CRI, high color preference, and higher beam intensities, but could suffer from insufficient lamp lifetime, poor color control over life and from lamp-to-lamp, and higher cost.

Although these existing technologies provide generally acceptable performance, further enhancement in performance, and/or color quality, and/or reduction in manufacturing cost, and/or increased wall plug energy efficiency, and/or increased lamp life and reliability would be desirable.

In recent years, light sources based upon solid state light (SSL) emitters (e.g., light emitting diodes or LEDs; laser diodes or LDs; and organic light emitting diodes or OLEDs) have come to the forefront by virtue of their very high efficiency in converting electricity into light, long life, as compared to incandescent and halogen lamps, variety of available colors enabling spectral tailoring, small size and high brightness, and rapidly declining cost. This invention is primarily concerned with new capabilities to illuminate white and colored objects by virtue of the spectral tailoring opportunities enabled by SSL light sources.

Many known LED chips (sometimes referred to as dies) may contain at least one semiconductor layer comprising a semiconductor material, such as, but not limited to: a gallium nitride, a zinc oxide, a silicon carbide, or combinations thereof. For example, many known LED chips may comprise a nitride compound semiconductor of In, Ga, Al and N, such as one which is represented by the formula $In_iGa_jAl_kN$ (where $0<i$; $0<j$; $0<k$ and $i+j+k=1$).

Many known LED-based light sources have been configured to produce light that appears to be substantially white, for use in general illumination applications and many specialty applications such as retail settings. Many known LED-based light sources possess tailored spectral power distribution of light to achieve excellent color-rendering properties, especially with respect to Color Rendering Index (CRI) and rendering of certain red colored objects (e.g., $R_9$).

There is a general desire to continuously improve white LED lamps for use in illuminating retail merchandise items such as clothing, and retail merchandise settings, especially with respect to white and brightly colored garments or retail merchandise settings having a mixture of white and colored objects. Of course, such light sources may also be the preferred illuminant in applications other than retail merchandise, such as e.g., residential, hospitality, education, museum, hospital, grocery, dining, commercial, and other color-sensitive applications.

SUMMARY OF THE INVENTION

In an embodiment, the disclosure provides a light source comprising at least one solid state light emitter. The light source, in operation, emits substantially white light having a Lighting Preference Index (LPI) of at least about 105, and this emission from the light source comprises a UV-violet flux of at least about 1%.

In another embodiment, the disclosure provides a light source comprising at least one solid state white light emitter; a yellow-absorbing color filter configured to selectively absorb yellow light from the at least one solid state white light emitter; and at least one solid state UV-violet emitter.

In another embodiment, the disclosure provides a light source comprising at least one solid state light emitter. The light source, when in operation, enhances or is capable of enhancing the apparent brightness of a fluorescent object, and also emits substantially white light having a Lighting Preference Index (LPI) of at least about 105.

In yet another embodiment, the disclosure provides a method comprising illuminating a fluorescent object with a light source comprising at least one solid state light emitter. The light source, in operation, emits substantially white light having a Lighting Preference Index (LPI) of at least about 105, and comprises a UV-violet flux of at least about 1%.

In a yet further embodiment, the disclosure provides a directional lamp comprising a reflective or refractive beam-forming optic; a light engine in optical communication with the beam forming optic; and a yellow-absorbing color filter for color filtering a radiant flux from the light engine. The light engine comprises an array of UV-violet LED chips and blue LED chips. The array is coated, on at least a portion of an emitting surface thereof, with a phosphor composition. The phosphor composition comprises at least one yellow or yellow-green phosphor, and at least one red phosphor. The light engine emits a UV-violet flux of at least about 1%, and this UV-violet flux may be emitted by the directional lamp. The directional lamp, in operation, emits substantially white light having a Lighting Preference Index (LPI) of at least about 105.

BRIEF DESCRIPTION OF THE DRAWINGS

Aspects and/or features of the invention and many of their attendant benefits and/or advantages will become more readily apparent and appreciated by reference to the detailed description when taking in conjunction with the accompanying drawings, which drawings may not be drawn to scale, wherein:

FIGS. 10A, 10B, 10C, 10D, 10E and 10F depict exemplary layouts of the blue LED chips and UV-violet chips in a CoB array, in accordance with embodiments of the invention.

DETAILED DESCRIPTION

Figure 1:
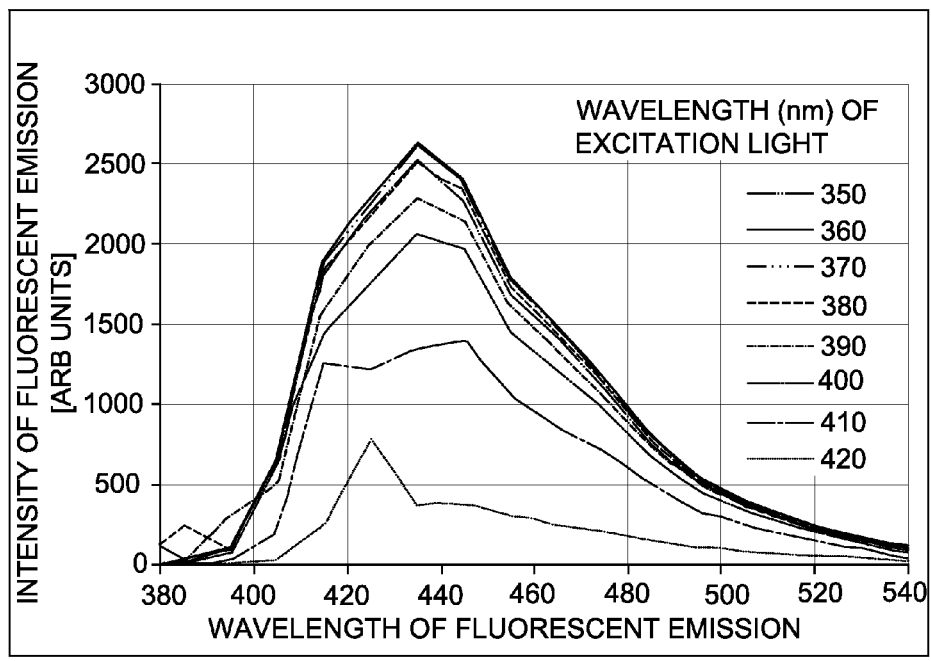
FIG. 1 depicts the emission spectrum of an typical fluorescent object as a function of various wavelengths of UV-violet excitation.

Embodiments of the present disclosure relate to a light source comprising at least one solid state light emitter, the light source in operation capable of enhancing the apparent brightness of a fluorescent object, the light source in operation emitting substantially white light having an enhanced color preference, e.g., a Lighting Preference Index (LPI) of at least about 100. Herein, the term "LPI" is defined by the quantitative formula for Lighting Preference Index (LPI) that quantifies the level of preference of an illuminant (light source) by a typical observer based on the appearance under that illuminant of a broad range of white and colored objects. LPI is defined in detail further below, and in commonly-owned International Application PCT/US2014/054868, filed 9 Sep. 2014, which is incorporated by reference.

As used herein, the term "light source" encompasses any of the following sources of light, in order of increasing system complexity.

(a) A light source may refer to a solid state light (SSL) emitter, such as an LED chip or LD chip or light emitting transistor (LET) chip, or OLED panel, or other SSL emitter. The definition of an SSL emitter may include the semiconductor junction and means for supporting the semiconductor mechanically and providing electrical connections to it;

(b) A light source may refer to a light engine, which is typically a plurality of SSL emitters providing emission of light comprising contributions from some or all of the SSL emitters;

(c) A light source may refer to a lighting module, which is typically a light engine mounted on a supporting structure. A light module typically may include a thermal path from the semiconductor junction to a thermal management system, as well as electrical connections, and may include an optical component or system;

(d) A light source may refer to a lamp, which may typically include a lighting module, electronic driver, optical components or system, thermal management component or system, base or connector, and, optionally, controls. A lamp may comprise a form factor such as A19, BR30, PAR38, or other directional or omnidirectional form factors. Alternatively, a light source may refer to a luminaire, which may include one or more lamps or the components typically comprising a lamp, and a fixture, such as a troffer;

(e) A light source may refer to a lighting system, which is generally a plurality of lamps or luminaires, which may be interconnected and controlled at a system level.

Any of the foregoing light sources may be configured or adapted, in accordance with the guidance of the present disclosure, to be capable of enhancing the apparent brightness of a fluorescent object and in operation emitting substantially white light having an enhanced color preference, e.g., a Lighting Preference Index (LPI) of at least about 100.

Herein, the term "SSL" generally refers to any semiconductor radiation source such as, e.g., LEDs, LDs, OLEDs, and other SSL technologies such as light emitting transistors (LETs and OLETs); or the like.

In order to configure a light source to provide the enhancement of the apparent brightness of a fluorescent object, the light source will comprise at least one UV-violet SSL emitter. Also, in order for the light source to provide a substantially white light having an enhanced color preference, it will also comprise a white light source that has been modified to have a spectral power distribution (SPD) that enhances color preference. In some embodiments, a white light source will be filtered (e.g., filtered by neodymium glass) to as to be capable of enhancing color preference. The combination of the UV-violet SSL emitter and the enhanced color preference "portion" of the SPD of a light source (and any filtering required to create the composite SPD of a light source), may be performed at any one of the above five levels ((a) to (e)) of the light source.

For example, in some embodiments, one may dispose a neodymium compound, which provides absorption of yellow light, within an LED chip (i.e., at the emitter level); or as part of an encapsulant of an LED package, or as part of a structure surrounding a light engine; or as part of a diffuser or optic in a lamp or luminaire; or as part of a filter enclosing some or all of a plurality of lamps or luminaires in a lighting system. The absorption of yellow light may be one mode of enhancing color preference.

In some embodiments, one may provide the UV-violet portion of the SPD of a light source in any one or more of the following ways, for example: one or more UV-violet LED emitters may be disposed within an LED package, or disposed in a chip-on-board (CoB) array; or one or more UV-violet light engines may be disposed among a plurality of light engines; or one or more UV-violet light sources may be disposed among a plurality of light sources; or one or more UV-violet lamps or luminaires may be disposed among a plurality of lamps for luminaires in a lighting system; or the like.

In some embodiments, the portion of the SPD of a light source that confers enhanced color preference may be provided by, for example: one or more enhanced color preference LED emitters within an LED package or in a CoB array; or one or more enhanced color preference light engines among a plurality of light engines; one or more enhanced color preference lighting modules among a plurality of lighting modules; or one or more enhanced color preference lamps or luminaires among a plurality of lamps or luminaires in a lighting system; or the like.

In a first aspect, the invention provides a light source which offers the ability to brighten an object that comprises an optical brightening agent (OBA). More particularly, in this first aspect, the invention provides a light source which comprises at least one or a plurality of solid state light emitters. The light source, when operational, produces a radiant flux that appears substantially white. A percentage of the radiant flux emanating from the light source is in a UV-violet light wavelength range. Such percentage is selected to be effective to brighten an object comprising an OBA. As used herein, the term "brighten" or "brightening" generally refers to a light source causing an object comprising an OBA, to enhance the visual perception of whiteness or brightness of the illuminated object, as if the illumination level were higher, or as if the reflectivity of the object were higher. This is typically possible when the light source emits UV-violet light in addition to visible light so that the OBAs are stimulated to emit fluorescence radiation. If the fluorescence radiation is in a blue wavelength region, then the whiteness would be typically enhanced. If the fluorescence radiation is in other color bands, then the vibrancy of other colors may be enhanced. Typically, these effects may occur when the object comprises a fluorescent pigment at a surface thereof. Herein, the term optical brightening agent (OBA) is meant to include brighteners for white as well as for colored objects.

One should note that any reference to a "first aspect", "second aspect", etc., do not necessarily refer to mutually exclusive embodiments. Thus, a light source which offers the ability to brighten an object that comprises a brightening agent as described above, may also be characterized in other terms, as described in detail in other aspects, below.

Herein the term "radiant flux" represents the sum of the light emitted by a light source in the visible range and the UV range, since the light source may emit some typically invisible UV light. Herein, a "UV-violet" light wavelength range may be defined as less than about 425 nm, e.g., less than about 420 nm, e.g., less than about 410 nm. Note that the Illumination Engineering Society of North America (IESNA) Lighting Handbook, 1984 Reference Volume, defines the longest range, UVA, of ultraviolet light to include 315 to 400 nm, and the visible range to include 380 to 770 nm. As would be understood by those skilled in the field, there may be overlap in the ranges of UV and visible wavelengths. Therefore, for the purpose of this disclosure, the UV range may be defined to include the range 315 nm to 400 nm; and the visible range to include 400 nm to 770 nm. As will be discussed in greater detail, the range of wavelengths effective for exciting OBAs is about 380 to about 420 nm, which bridges the UV and visible ranges, as defined. The "UV-violet" light wavelength range may be defined as from about 350 nm to about 425 nm, e.g., about 380 nm to about 420 nm, e.g. about 400 nm to about 410 nm. The wavelength range for "UV-violet" to be chosen is usually selected to maximize the brightening effect upon the selected object, while also moderating or minimizing any deleterious effects of any UV-violet radiation emission (e.g., degradation of materials, or safety concerns, or reduced efficiency, or the like).

Figure 6:
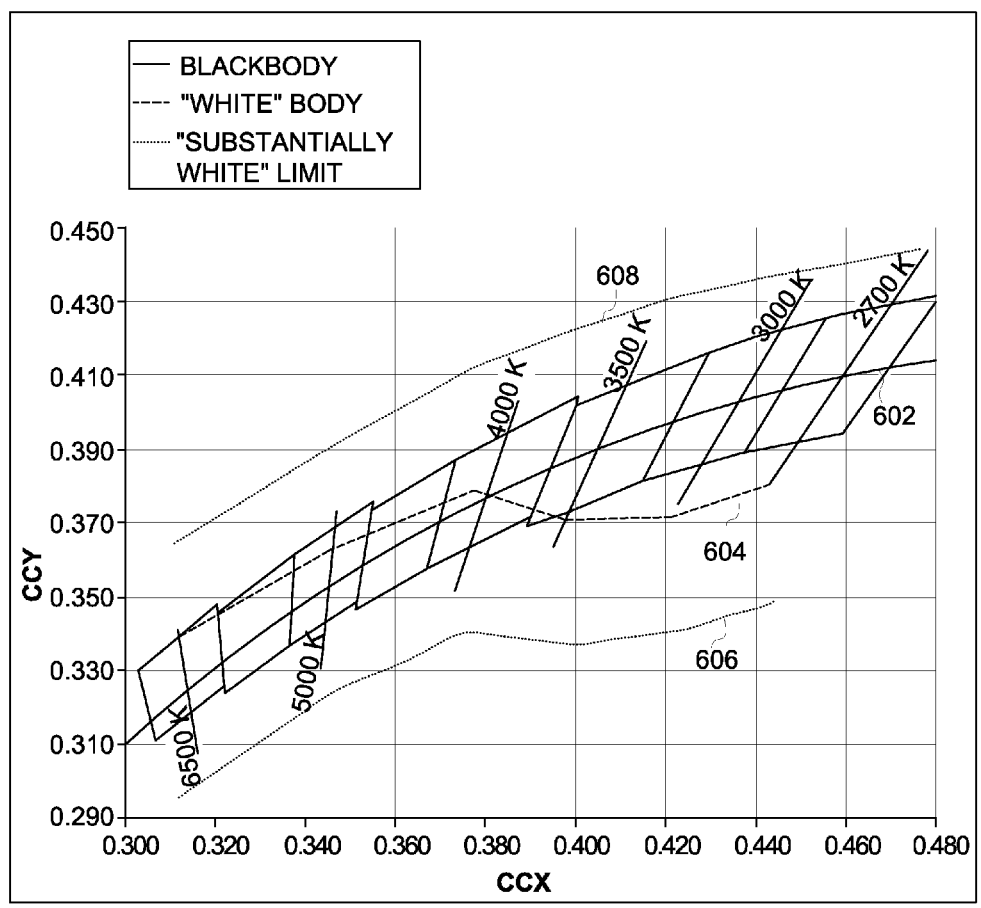
FIG. 6 depicts the location of the "white-body line" and the blackbody curve for various color temperatures.

As used herein, the term "substantially white" typically refers to an illuminant or light source characterized by a CCT in the range of about 2000 K to about 10000 K (more typically from about 2700 K to about 6500 K), and having a color point that deviates from either the blackbody locus (BBL), or the white-body line (WBL), by no more than about a 10-step MacAdam ellipse, as depicted by the lower 606 and upper 608 limits in FIG. 6. This interpretation applies to the principles regarding the perception of white light as presented herein. Alternatively, "substantially white light" may be interpreted in a broad sense, so as to comprise multiple variants of white light, such as, e.g., cool white, warm white, or a combination of the two whites; or the like.

When the light source is used to illuminate an object comprising an OBA, the object may generally appear to be brighter as compared to the same light source absent the radiant flux in a UV-violet light wavelength range.

A brightening agent may typically be selected from one or more of fluorescent material, optical whitening material, phosphorescent material, or fluorescent pigment; or the like. As would be understood by persons skilled in the lighting arts, fluorescent materials typically are excited at relatively shorter wavelengths (e.g., UV-violet) and emit the absorbed energy at relatively longer wavelengths (e.g., visible). An optical whitening material, sometimes referred to as an optical brightener, optical brightening agent, fluorescent brightening agent or fluorescent whitening agent (the terms may be considered as substantially synonymous), are colorless dyes that absorb light in the ultraviolet and violet region of the electromagnetic spectrum, and re-emit light in other regions of the visible spectrum, e.g., the blue region. These materials are often used to enhance the white appearance of fabric and paper, causing a whitening or brightening effect, typically making materials look less yellow by increasing the overall amount of blue light reflected. A fluorescent pigment material, sometimes referred to as a "glow-in-the-dark" or "black-light" pigment (the terms may be considered as substantially synonymous), are colorless dyes that absorb light in the ultraviolet and violet region of the electromagnetic spectrum, and re-emit light in other regions of the visible spectrum, e.g., the green, yellow, and red regions. These materials are often used to enhance the vibrancy of colored papers, fabrics, and paints, causing a brightening effect, typically making materials look as if they are self-illuminated or unusually brightly colored.

In some embodiments, the brightening agent may comprise a chemical selected from one or more of stilbenes or stilbene derivatives, coumarins or coumarin derivatives, thiophenes or thiophene derivatives, bisazoles or bisazole derivatives, benzoxazones or benzoxazone derivatives, or pyrazolines or pyrazoline derivatives; or the like. Other chemicals are possible provided they are effective for imparting optical brightening to an object. In some embodiments, the brightening agent is selected such that its fluorescence excitation wavelength may be in a range of about 350 to about 425 nm. Typically, the brightening agent may have a fluorescence emission in a wavelength of about 420 to about 700 nm. For an optical whitening agent, usually, its peak fluorescence emission is in a blue range, or about 420 to 480 nm.

In many embodiments, the object comprising a brightening agent may comprise paper, packaging, fabric, clothing, paint, teeth, hair, skin, or walls, or even a luminaire configured to comprise a brightening agent. Hair, skin and teeth may be configured to comprise a brightening agent through application of personal care products such as cosmetics or shampoo. Other materials which sometimes may comprise optical brighteners may include plastics, toys, fibers, etc.

Figure 2:
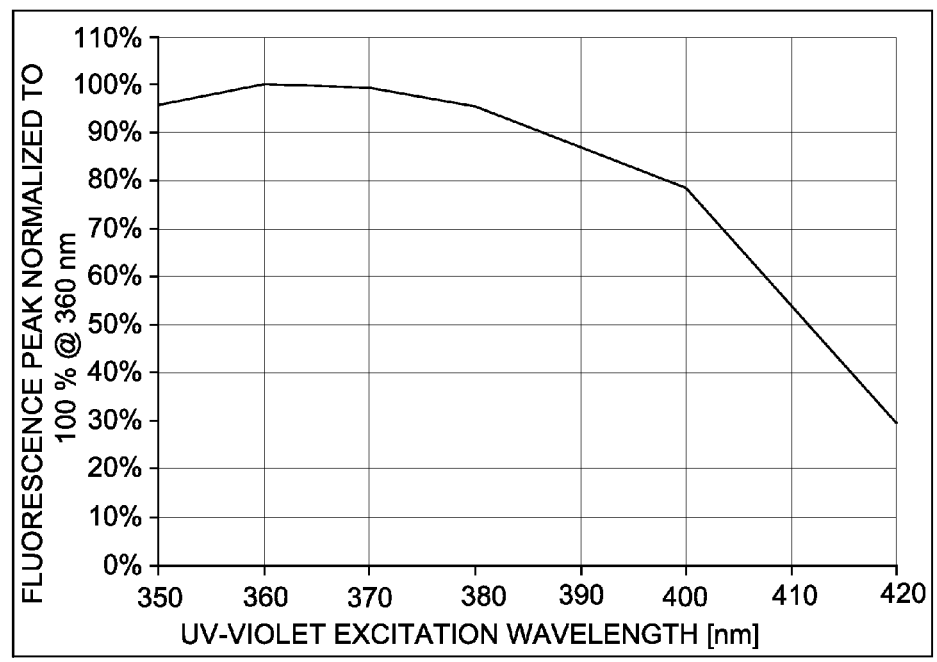
FIG. 2 depicts the same data as FIG. 1 where the peak of the fluorescent emission intensity is shown vs. the wavelength of the UV-violet LED that is exciting the fluorescence of the fluorescent object.

The spectrum of FIG. 1 depicts the emission spectrum of a typical white cotton towel as a function of various wavelengths of UV-violet excitation. The wavelength on the abscissa is in nanometers, and the emission intensity on the ordinate is in arbitrary ("arb") units. A phosphor characterization spectrometer was used to determine the wavelength range of the emitted light that provides the brightening response, and to determine the intensity of the fluorescent emission from the OBA as a function of the wavelength of the incident UV-violet excitation light. Each nested curve represents a different excitation wavelength of a UV-Violet LED. The peak of the emission spectrum is at about 435 nm, providing a visually perceptible "blue-white" enhancement to the white towel. FIG. 2 depicts the same data as FIG. 1 where the peak of the fluorescent emission intensity is shown vs. the wavelength of the UV-violet LED that is exciting the fluorescence of the OBA. The primary result from the curve of FIG. 2 is that the onset for excitation of the brightening effect (where the effect exceeds about half of the maximum effect that occurs at about 360 nm) occurs for an excitation wavelength of the UV-violet LED at about 410 nm, increasing with shorter excitation wavelength, reaching a maximum effect at about 360 nm, but 420 nm and longer excitation wavelengths are not as effective for this particular object having an OBA. Visual observations have provided similar results with a broad range of other white fabrics whereby a preferred excitation wavelength generally exists below about 410 nm.

In some embodiments of the invention, the percentage of the radiant flux of the light source which is in the wavelength range of UV-violet is selected such that it substantially does not perturb a substantially white color point. Herein we define "percentage of UV-violet flux" or "percentage of radiant flux in the UV-violet range", to be the wavelength-integrated flux (in watts) of the UV-violet light portion of a substantially white light source, divided by the wavelength-integrated visible flux (in watts) of the substantially white light source, as given in Equation 1:

$$\% \text{ UVviolet flux} \equiv 100 * \frac{\int_{315nm}^{420nm} \Phi_\lambda d\lambda}{\int_{400nm}^{770nm} \Phi_\lambda d\lambda}, \quad \text{Equation 1}$$

where $\Phi_\lambda$ [in W/nm] is the spectral radiant flux, i.e., the radiant flux [in Watts] per unit wavelength interval [in nm], also referred to as the spectral power distribution (SPD). As can be seen, there is overlap in wavelength between the "UV-violet" range and the "visible" range in this Equation 1; nevertheless, the person skilled in the field can determine the respective radiant flux for each range.

In embodiments of this disclosure, the total radiant flux of the lighting source comprises some light in the UV-violet range, but not such a great amount of light in the UV-violet range so that the color point of the light source, including the contribution from the UV-violet flux, is perturbed from being substantially white.

Figure 3:
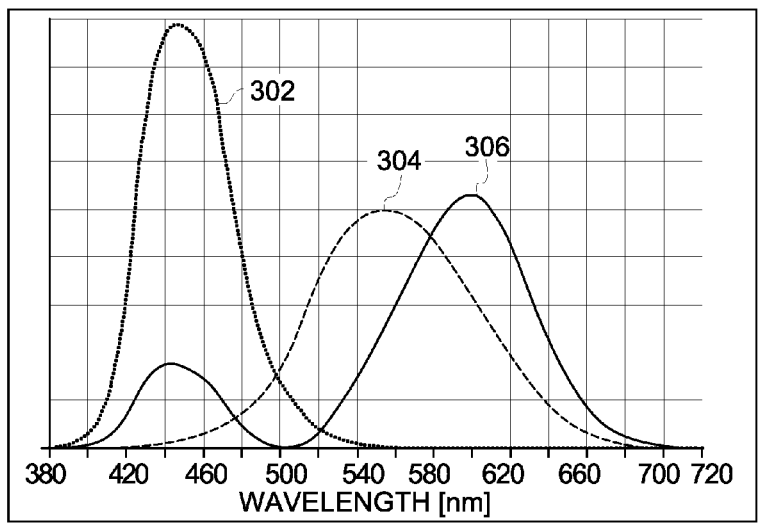
FIG. 3 displays the three color matching functions vs. wavelength of light for the human retina.

This is because UV-violet light, if emitted at sufficiently short wavelengths, and in sufficiently low percentage of UV-violet flux, does not substantially contribute to the perception of color by the human eye. This can be appreciated in FIG. 3 which displays the three color matching functions $\bar{x}$, $\bar{y}$, and $\bar{z}$ vs. wavelength of light for the human retina (curves 302, 304, 306, respectively). The basic photometric and colorimetric values in the 1931 CIE color system, (e.g., lumens, and the chromaticity coordinates, ccx and ccy, and the correlated color temperature, CCT) are calculated as integrals of the SPD of the light source over those three color matching functions. As such, emission from the light source at any wavelength at which all three of the color matching functions are very small, will have a correspondingly very weak contribution to the color point of the light source. From FIG. 3, it is apparent that emission from the light source having wavelengths shorter than about 410 nm will have a very weak effect on the chromaticity (i.e., ccx, ccy, and CCT) of the light source.

Figure 4:
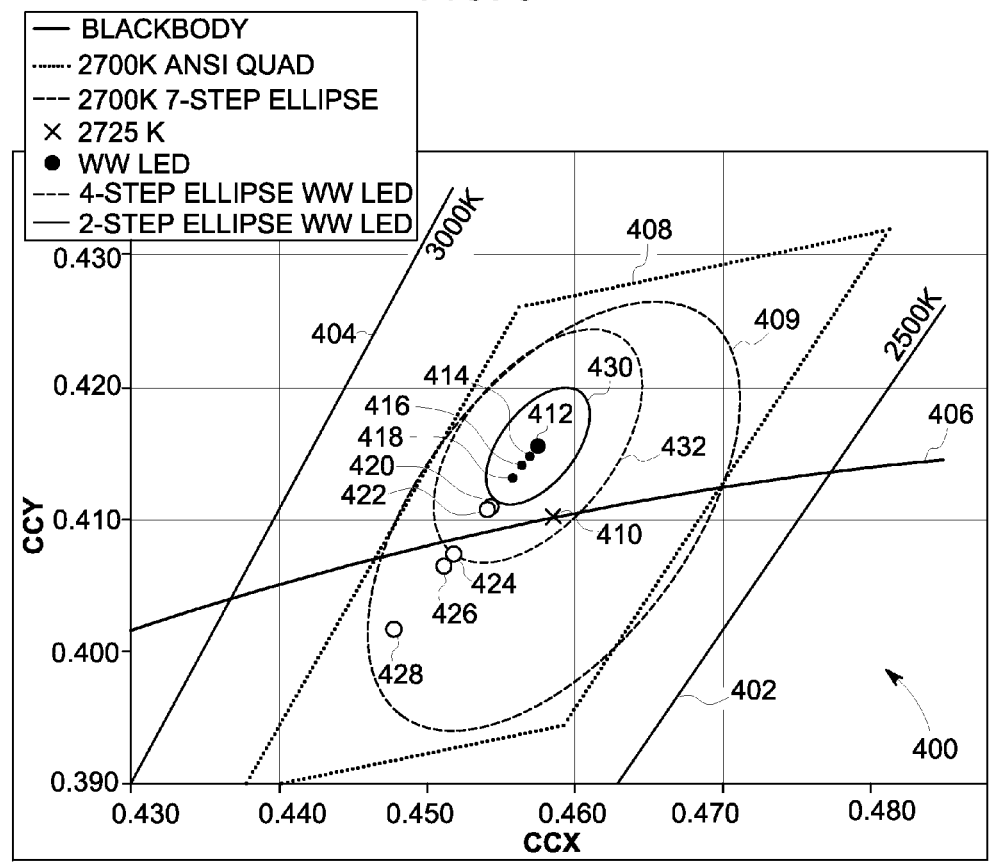
FIG. 4 provides a plot of the chromaticity space (ccx, ccy) encompassing the color point of a several substantially white light sources having a nominal CCT of about 2700 K.

In order to quantify this effect, FIG. 4 provides a plot 400 of the chromaticity space (ccx, ccy) encompassing the color point (412, 414, 416, etc.) of a substantially white light source having a nominal CCT of about 2700 K. Included in the plot are the isotherm lines 402 along which the CCT of a light source is 2500 K, and 404 along which the CCT of a light source is 3000 K. The curve 406 is the blackbody locus (BBL), on which the chromaticity point 410 denotes the color point at which CCT=2725 K on the BBL, serving as the center point of the quadrangle 408 that outlines the American National Standards Institute (ANSI) color bin that is nominally referred to as the 2700 K bin in the reference standard ANSI C78.377-2008, herein incorporated as reference. To be qualified for Energy Star certification by the United State Department of Energy (DoE), an LED replacement lamp must meet the requirements of Version 1.1 Integral LED Lamps Specification, incorporated herein as reference, including the requirement that the chromaticity of the lamp be located within the quadrangle corresponding to its nominal CCT as provided by ANSI C78.377-2008. Energy Star certification is referenced herein not necessarily as an objective or target of all embodiments in this invention, but rather as an industry-recognized standard of quality for an LED light source, including color quality, as defined by the color point lying within the quadrangle corresponding to the nominal CCT, along with a minimum CRI requirement of 80. Therefore, the quadrangle 408 represents the range of chromaticity qualifying for Energy Star rating for a nominal CCT=2700 K. Similar requirements and quadrangles would be understood for other nominal CCT values of 3000 K, 3500 K, and 4000 K which, along with 2700 K, are intended for indoor applications; and also higher nominal CCT values that might be intended for outdoor, industrial or other applications. The chromaticity point 412 is that of a typical commercially available warm-white (WW) LED light source having CCT of about 2775 K, and located above the BBL by amount corresponding to about one-third of the distance from the BBL 406 to the perimeter of the ANSI quadrangle 408. Even though this light source does not have the center chromaticity 410, it does lie within the quadrangle 408, and therefore qualifies as a nominal 2700 K light source. Any chromaticity within the quadrangle 408 is considered to be at an acceptable chromaticity (color) point per the standards. The size of the ANSI quadrangles were chosen to approximate a maximum deviation of a 7-step MacAdam ellipse 409 from the center point 410 (in the case of the 2700 K quadrangle). A one-step MacAdam ellipse represents the locus in color space surrounding a center point at which the deviation in color space from the center color point is at the threshold of detectability by a typical observer. Deviations of up to about 2 to 4 MacAdam ellipses are barely perceptible to a typical observer, and are therefore generally acceptable; while deviations of about 5 or more MacAdam ellipses are easily perceptible and therefore may not be acceptable by users of the light source.

Again, a discussion of FIG. 4 continues here, for purposes of illustrating how deviations in color point from a given light source may be acceptable. For example, if the color point 412 of a given substantially white light source lies within the 2700 K quadrangle 408, we can consider that deviations from that color point, for example due to the addition of UV-violet flux to the light source that result in a new color that lies within about 2 to 4 MacAdam ellipses are therefore generally acceptable variations of the light source having color point 412. The two-step ellipse 430 and 4-step ellipse 432 centered on the color point 412 therefore represent a generally acceptable range of color point for the light source producing flux having the color point 412 plus the additional UV-violet flux.

Figure 5A:
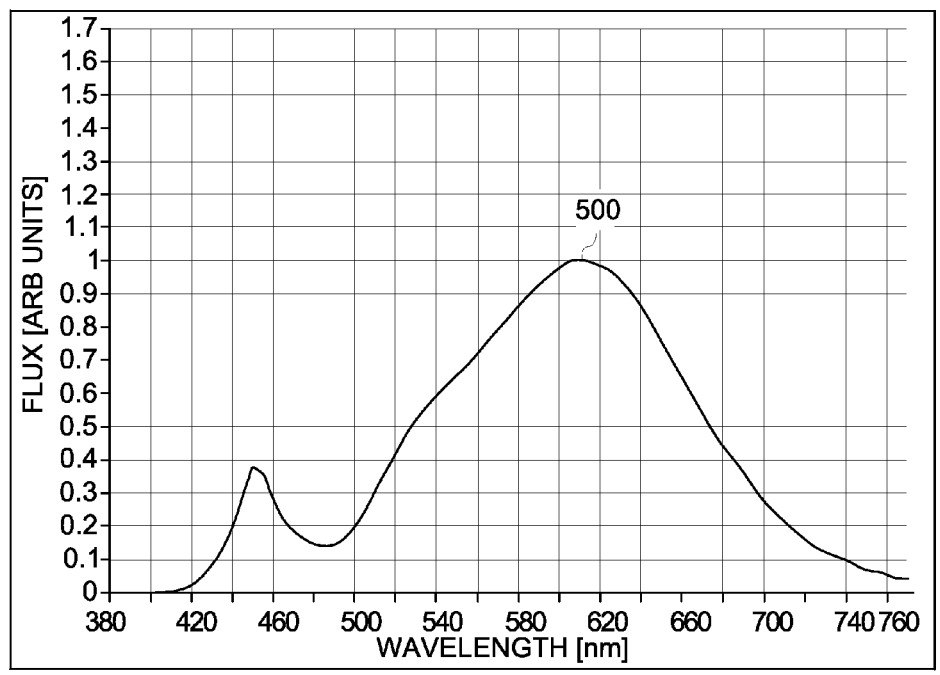
FIG. 5A and FIG. 5B show comparative spectral power distributions for color points without, and with additional UV-violet flux.
Figure 5B:
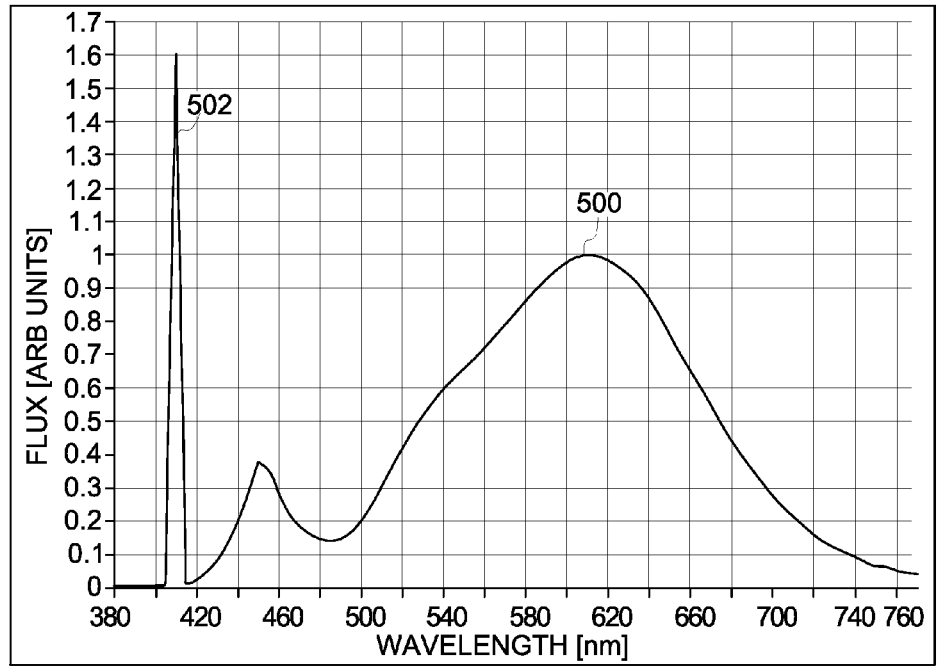

FIG. 5a provides the SPD 500 corresponding to the color point 412 having no additional UV-violet flux. The SPD 502 in FIG. 5b demonstrates the addition or supplementation of the SPD 500, with 5% of UV-violet flux at a wavelength of 410 nm. The composite SPD 502 produces the color point 420 in FIG. 4 which lies very slightly outside of the two-step MacAdam ellipse 430 centered on the color point 412. The color shift of about a two-step MacAdam ellipse between color point 412 representing SPD 500 having no supplemental UV-violet, and color point 420 representing SPD 502 having 5% UV-violet flux at a wavelength of 410 nm is attributed to the UV-violet flux.

The color points 414, 416, 418, 420, 422, 423, 424, 426, 428 for light sources comprising SPD 500 plus supplemental UV-violet flux are plotted in FIG. 4 as a function of the % UV-violet flux and the maximum for the UV-violet wavelength labeled according to Table I.

TABLE I

| Label | % UV-violet flux | UV-violet wavelength (max) |
|---|---|---|
| 414 | 5% | 395 nm |
| 416 | 5% | 400 nm |
| 418 | 5% | 405 nm |
| 420 | 5% | 410 nm |
| 422 | 10% | 405 nm |
| 424 | 5% | 415 nm |
| 426 | 10% | 410 nm |
| 428 | 5% | 420 nm |

As seen by comparison of the color points 420 and 422 with the 2-step MacAdam ellipse 430, addition of a 5% UV-violet flux at a wavelength of 410 nm, or addition of a 10% UV-violet flux at a wavelength of 405 nm, produces a shift in color point of only about a 2-step MacAdam ellipse, representing just barely perceptible color deviation, and so would be acceptable even in discriminating color applications. Any composite light sources having substantially <5% UV-violet flux and UV-violet wavelength <410 nm will produce a color point within the 2-step MacAdam ellipse. Any composite light sources having substantially <10% UV-violet flux and UV-violet wavelength <405 nm will also produce a color point within the 2-step MacAdam ellipse.

As seen by comparison of the color points 424 and 426 with the 4-step MacAdam ellipse 432, 5% UV-violet flux at a wavelength of 415 nm, or 10% UV-violet flux at a wavelength of 410 nm produce a shift in color point of only about a 4-step MacAdam ellipse, representing barely perceptible color deviation, and so would be acceptable in most typical applications. Any composite light sources having substantially <5% UV-violet flux and UV-violet wavelength <415 nm will produce a color point within the 2-step MacAdam ellipse. Any composite light sources having substantially <10% UV-violet flux and UV-violet wavelength less than 410 nm will also produce a color point within the 4-step MacAdam ellipse.

As seen by comparison of the color point 428 with the four-step MacAdam ellipse 432, a 5% UV-violet flux at a wavelength of 420 nm, produces a shift in color point significantly exceeding a 4-step MacAdam ellipse, representing generally unacceptable color deviation, and so may not be acceptable in many typical applications. Any composite light source having substantially >5% UV-violet flux and UV-violet wavelength >420 nm will produce a color point significantly exceeding a 4-step MacAdam ellipse, and may be generally unacceptable.

In some other embodiments, the percentage UV-violet flux and the UV-violet wavelength are both selected to shift the color point of the composite light source. Typically, since the location of the UV-violet emitter in CIE color space when combined with the remainder of the spectrum of the light source, results in a composite color point that is shifted below the BBL, toward the white-body locus (WBL), the perceived whiteness of the color point is enhanced by virtue of being closer to the WBL due to the relatively strong contribution from the UV-violet emitter.

There is a corresponding first method aspect of this disclosure, which relates to a method for making an object appear brighter. In this aspect, a method comprises the steps of exposing an object comprising a brightening agent to light from a light source, the light source comprising a plurality of solid state emitters and emitting substantially white light having an enhanced color preference (e.g., LPI of greater than about 100). While the light from the lamp appears substantially white, the light also comprises from about 1% to about 30% (e.g., from about 5 to about 10%) of its radiant flux in a UV-violet light wavelength range. The object comprises a brightening agent, e.g., one or more of fluorescent material or an optical whitening material. As noted above, the brightening agent may comprise any of the materials and/or chemicals noted above in connection to brightening agents. Typically, the brightening agent may be excited to fluorescence by light having a wavelength of from about 350 to about 425 nm, and may have a fluorescence emission in a wavelength of about 420 to about 700 nm. Generally, the object may be any of the objects comprising brightening agent referred to above, e.g., paper, packaging, fabric, clothing, paint, teeth, walls, or luminaire; or the like.

In a second aspect of the present invention, a light source is disclosed in terms of a specified output in the UV-violet wavelength range. In particular, this aspect provides a light source comprising a plurality of solid state light emitters. The light source, when operational, produces a radiant flux that appears substantially white. Greater than about 1%, e.g., from about 1% to about 30%, of the radiant flux of the light source is in a UV-violet light wavelength range. In a more specific embodiment, about 5% to about 10% of the radiant flux of the light source may be in a UV-violet light wavelength range. As used herein, the UV-violet light wavelength range may be less than about 425 nm, e.g., less than about 420 nm, e.g., less than about 410 nm. Typically, the UV-violet light wavelength range may be from about 350 nm to about 425 nm, e.g., about 380 nm to about 410 nm, e.g., about 400 nm to 410 nm. In one concrete exemplary embodiment, about 10% of the radiant flux of the light source is at wavelength of about 400 to 405 nm. However, the invention is by no means limited to this concrete embodiment.

The plurality of solid state light emitters typically may comprise one or more LED chips. Alternatively, the plurality of solid state light emitters may comprise LD, or OLED devices, or a combination of LED, LD, and OLED devices, or any other type of solid state light emitter.

In accordance with this second aspect, there are various ways in which to achieve the selected percentage of radiant flux in the UV-violet range, while employing LED chips. For example, the light source may comprise a first set of one or more LED chips configured to produce light that appears substantially white when the light source is operational, and further comprise a second set of one or more UV-violet LED chips. Many known UV-violet LED chips may be employed; for example an attractive UV-violet LED with a peak emission at about 407 nm and sold under the VIO name by GE Lighting may be used, although others as possible as well. Typically, the one or more UV-violet LED chips may comprise a peak emission in a UV-violet wavelength range, as described above.

Alternatively, it may be possible for the light source to comprise an LED which is capable of emitting both blue light and UV-violet light. The latter is attainable with some types of "broadband" LED chips which may comprise a peak emission at, e.g., about 430 nm, and yet also have a residual emission at about 405 nm. Through selection of a suitable phosphor or combination of phosphor, the peak emission may be phosphor-converted into substantially white light while the residual emission is not phosphor converted when the light source is operational. A suitable phosphor or combination of phosphors would generally absorb and convert the blue light from the "broadband" chip and not absorb and convert the violet light.

Typically, the light source may comprise a greater number of LED chips configured to produce light that appears substantially white, than the number of UV-violet LED chips. For example, a light source may comprise from about 50 to about 150 LEDs configured to produce white light and from about 1 to about 15 UV-violet-emitting LED chips. Other numbers of respective chips are possible, depending upon application.

In some selected embodiments, the one or more LED chips configured to produce light that appears substantially white, and the one or more UV-violet LED chips, respectively, may be driven at substantially the same current, and/or are serially connected. It may be convenient for manufacture and/or assembly of a light source to place the "white" LED(s) and the UV-violet LED(s) on the same string. In some selected embodiments, the one or more LED chips configured to produce light that appears substantially white, and the one or more UV-violet LED chips, may be substantially voltage-matched.

In accordance with some embodiments, the one or more LED chips which are configured to produce light that appears substantially white, and the one or more UV-violet LED chips, are mounted on a circuit board, e.g., a metal-core printed circuit board (MCPCB). This may be accomplished in a chip-on-board (COB) array. For example, in the prior art, numerous types of chip-on-board array light engines are known, including, e.g., a Cree MT-G array (e.g., Cree MT-G2 array) or a Nichia 110 array. It may be possible to suitably modify many of these known chip-on-board array light engines with a supplemental number of UV-violet LED chips, so as to attain some light sources of the present disclosure. In a COB array, the LED chip is generally soldered (or eutectic attached, or attached by conductive epoxy, or the like) directly onto a circuit board, e.g., MCPCB. COB technology may sometimes be referred to as "direct chip attachment", or DCA. This refers to semiconductor assembly technology wherein the LED chips are directly mounted on and electrically interconnected to their final circuit board, instead of undergoing traditional assembly or packaging as individual integrated circuits. The COB process often consists of three major steps: die attach or die mount; wirebonding; and optionally encapsulation of the die and wires. As is generally known, a MCPCB comprises a layered structure comprising a thermally conducting base, typically aluminum, an electrically non-conducting/thermally conducting dielectric layer and electrically conducting circuit layer typically made of copper.

In a third aspect of the present disclosure, a light source which is capable of brightening an object that comprises an optical brightening agent (OBA), is also spectrally tailored to provide enhanced color preference. More particularly, in this third aspect, the invention provides a light source which comprises a plurality of solid state light emitters. The light source, when operational, produces a radiant flux that appears substantially white. A percentage of the radiant flux emanating from the light source is in a UV-violet light wavelength range. Such percentage is selected to be effective to brighten an object comprising an OBA. Additionally, the visible portion of the spectrum of the light source is modified to enhance color preference such that LPI is above the level of LPI=100 that characterizes a "reference light source". Herein, the term "reference light source" is defined to be a light source producing light having a correlated color temperature (CCT) equal to the CCT of the test light source, and having a spectrum defined by the Planckian or Blackbody spectral distribution, defined by Planck's law for blackbody radiation. Planck's law provides the radiance of the light source B (in W/sr·m³) as a function of wavelength λ (in meters) and absolute temperature T (in K) as:

$$B_\lambda = \frac{2hc^2}{\lambda^5} \frac{1}{e^{\frac{hc}{\lambda k_B T}} - 1}$$

where h is the Planck constant and $k_B$ is the Boltzmann constant. By the definition of CRI, the reference light source will have CRI=100. Also by the definition of LPI, the reference light source will have LPI=100. LPI is calibrated such that perceived color preference differences between light sources differing in LPI by about 5 points are about equally perceivable by a typical observer as are color fidelity differences between light sources differing in CRI by about 5 points. Therefore, the term "enhanced color preference" herein means that LPI is greater than that of the reference light source (having LPI=100) by at least about 5 points, i.e., LPI greater than about 105, or greater than about 110, or greater than about 120. It is known that LPI may be enhanced by about 10 points or more relative to a reference light source (e.g., an incandescent lamp) by including within the light source a means to absorb yellow light in the wavelength range of about 570 nm to about 600 nm, e.g., by use of a Nd-doped glass absorber, as practiced by GE in the REVEAL® brand of incandescent, halogen, and LED lamp products. It is also known that LPI may be enhanced by about 20 points or more relative to a reference light source by tailoring the spectrum of an LED light source by combinations of LED emitters and phosphors (and, optionally, absorbers or color filters), as disclosed in International Patent Application PCT/US2014/054868, incorporated herein by reference.

Figure 8A:
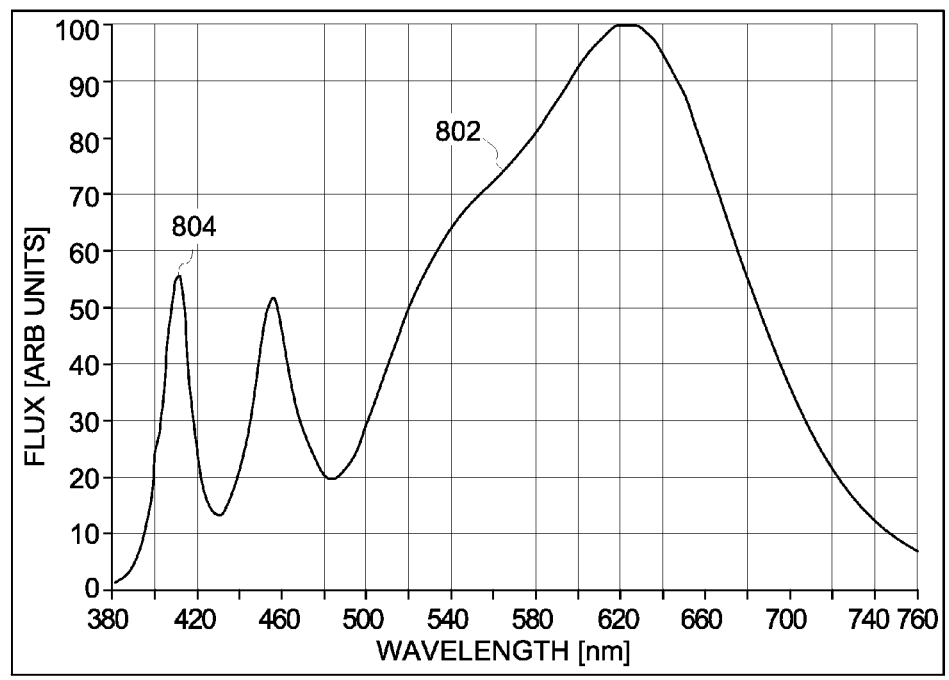
FIG. 8A is a spectral power distribution curve for a prior art LED product.
Figure 8B:
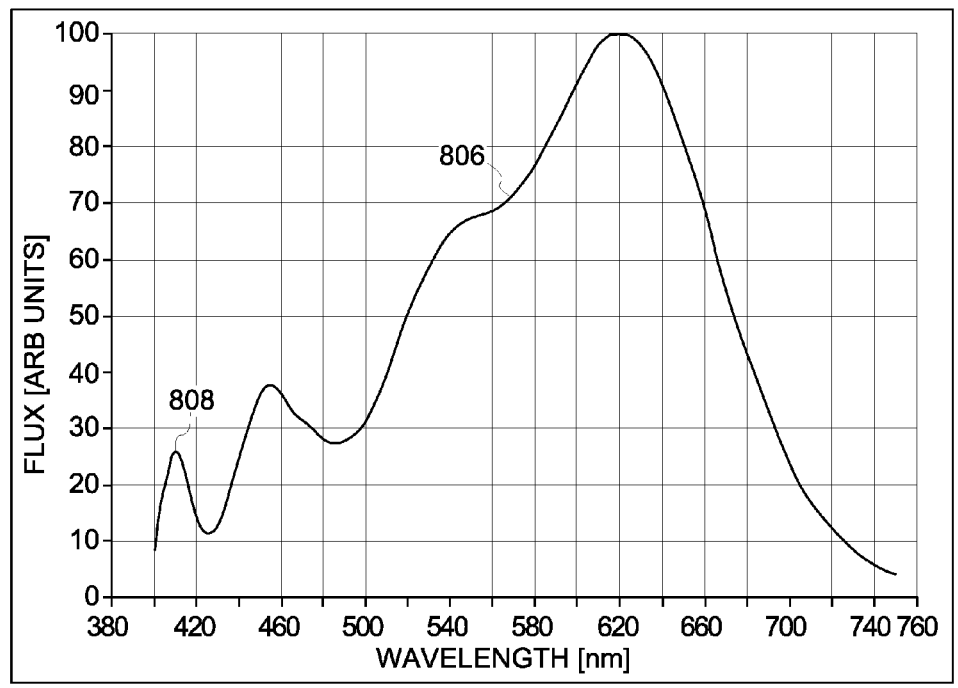
FIG. 8B is a spectral power distribution curve for another prior art LED product.

It is generally known that excitation of OBA's may be achieved by supplementing the flux 802 of a substantially white light source with the flux 804 of a UV-violet light source. This is generally depicted in FIG. 8a, which may be attributed to the product specification sheet for the LUXEON CoB with "CrispWhite Technology DS138" (©2014 Philips Lumileds Lighting Company); or by supplementing the flux 806 of a substantially white light source with the flux 808 of a UV-violet light source, as shown in FIG. 8b, which may be attributed to published patent application US-2013/0313516-A1, assigned to SORAA, Inc. In both prior art cases of FIG. 8a or FIG. 8b, the light sources produce excitation of the OBA's and maintain the color point on or near the BBL, and provided relatively high CRI. This is characteristic of the traditional modes for optimization of a light source SPD: attempt to simulate the blackbody reference light source, generally achieving good color fidelity (i.e., high CRI), but without any regard for color preference (i.e., LPI). As a result, the LPI values for the prior art which incorporates UV-violet flux in order to excite OBA's solely for the purpose of enhancing the whiteness and brightness of white objects, are accordingly close to the LPI value pertaining to the blackbody reference light source at their respective CCT values. This is summarized in Table II below. In contrast, it is a general objective for embodiments of the present disclosure to enhance color preference (LPI), and not simply enhancing color fidelity (CRI) so that most or all of the colors, as well as white, are enhanced as perceived by a typical observer.

TABLE II

| Light source | CCT | Duv | CRI | LPI |
|---|---|---|---|---|
| FIG. 8a | 3014 | −0.003 | 90 | 102 |
| FIG. 8b | 3053 | 0.000 | 92 | 99 |
| Reference | 3000 | 0.000 | 100 | 100 |

In accordance with explaining this third aspect involving color preference, it is important to note that many persons skilled in the lighting industry until recently did not believe that color preference cannot be adequately quantified by any single existing color metric. Several attempts have been published to combine two or more color metrics to better describe color preference. However, it does not appear that there was an industry-standard proposal for a color preference metric that defines color preference with sufficient quantitative rigor to enable the optimization of the color preference of a light source by numerical tailoring of the spectrum. Although certain quantitative color preference metrics exist, these are generally deficient in some way to disqualify their use as an optimization parameter when designing a light source or a spectrum to achieve optimum color preference for a typical observer.

For nearly a half-century, the color rendering index (CRI) has been the primary method of characterizing the color quality of a light source. However, its effectiveness is inherently limited due to its method of calculation, particularly when dealing with spectral power distributions (SPDs) containing steep slopes versus wavelength, as often seen with LEDs. Due to its shortcomings, a variety of alternative metrics have been proposed. However, alternate color quality metrics struggle to accurately quantify consumer preference of lighting products.

Houser and colleagues provide a detailed overview and comparison of a large fraction of the various color quality metrics developed in "Review of measures for light-source color rendition and considerations for a two-measure system for characterizing color rendition", Optics Express, volume 21, #8, 10393-10411 (2013), authors: K. W. Houser, M. Wei, A. David, M. R. Krames, and X. S. Shen. In general, the several color quality metrics can be broken down into three broad categories pertaining to their intent and method of calculation: fidelity, discrimination, and preference. Fidelity metrics, which include CRI, quantify an absolute difference from a reference illuminant, regardless of whether the test illuminant is perceived as being better or worse, and without consideration to whether the reference illuminant is actually preferred by most observers. Discrimination metrics quantify the total area of color space that is can be rendered under the test illuminant, and are maximized at extreme levels of saturation and hue distortion. The existing color preference metrics have been developed to provide a quantitative measure of user color preference, but none provides a sufficient correlation to observer data, along with a target value to enable optimization of a light source, so that the metric can be used as a target parameter in a design optimization.

In general, it has been found that observers prefer an enhanced level of saturation, rendering colors more appealing. However, high levels of saturation, or shifts in hue, can result in unnatural rendering of colors and objects. For example, the Gamut Area Index (GAI) and the Gamut Area Scale ($Q_g$), both of which are discrimination metrics, provide a very good correlation with observer preference up to some limit of color saturation, beyond which GAI and $Q_g$ continue to increase, while observer preference sharply declines. It therefore appears color saturation metrics such as GAI or $Q_g$ do not align well with observer preference. Furthermore, observers also tend to prefer light sources that appear whiter, driven by the color point of the illuminant relative to the Planckian (blackbody) locus, somewhat independent of the color saturation.

Some well-known metrics in the color preference category include Flattery Index ($R_f$), Color Preference Index (CPI), and Memory Color Rendering Index (MCRI). All three of these metrics have "ideal" configurations for the chromaticity coordinates of eight to ten test color samples, and each quantifies the deviation from these target values. The flattery index was the first metric to target preference and used ten color samples with unequal weighting. However, in order to maintain similarity with CRI, the target chromaticity shifts were reduced to one-fifth of their experimental values, greatly reducing its impact. CPI maintained the experimental values for preferred chromaticity shifts, resulting in a better representation of color preference. However, it is somewhat limited in its selection of test color samples, using the same eight, unsaturated test colors as CRI. Unsaturated (pastel) test colors are incapable of evaluating the impact of a highly saturated light source. MCRI uses observers' memory to define the ideal chromaticity configuration of ten colors of familiar objects. Furthermore, none of the metrics above factor in the "whiteness", or color point, of the test source. To this point, authors J. P. Freyssinier and M. S. Rea, in "Class A color designation for light sources used in general illumination," Journal of Light and Visual Environment, volume 37, #2&3, pp. 46-50 (2013), recommended a series of criteria for "Class A Lighting", which places constraints on CRI (>80), GAI (80-100), and color point (near the so-called "white" line). While these conditions define a recommended design space, they cannot be optimized to prescribe a spectrum or light source that maximizes color preference, as there is no optimal value identified, and no weighting of the three characteristics recommended.

Therefore, for purposes of quantifying color preference, herein the LPI metric will be employed; this metric is fully described and defined below and in International Application PCT/US2014/054868, incorporated by reference. LPI is quantitatively and objectively defined and calibrated so as to provide correlation with measurements of observer preferences from among a demographic population. Furthermore, the LPI metric is demonstrated to be a predictive metric that can be used to optimize the spectra of light sources in order to elicit the predicted color preference responses from observers for a variety light sources having a broad range of LPI values. LPI may be used as a quantitative metric to provide design rules to maximize color preference characteristics of light sources, and/or to design multiple-response optimizations of a spectrum that include color preference, along with other photometric, colorimetric, and other design responses.

The LPI metric is a function of two parameters: the Whiteness of the illumination source and the Color Appearance of objects illuminated by the source. The specific LPI function is defined below, after explanation of Whiteness and Color Appearance.

As used herein, Whiteness refers to the proximity of the color point to the "White Line" (or the White Body Line, or WBL) on the chromaticity diagram, where the "WBL" is defined in the following publication: "White Lighting", Color Research & Application, volume 38, #2, pp. 82-92 (2013), authors M. S. Rea & J. P. Freyssinier (henceforth, the "Rea reference"). The Rea reference is hereby incorporated by reference. As used herein, the "White Line" is defined by the color points in Table III below, as reported in CCX and CCY color coordinates for selected color temperatures from 2700 K to 6500 K.

TABLE III

| Color Temp. (CCT) | CCX | CCY |
| --- | --- | --- |
| 2700 K | 0.4431 | 0.3806 |
| 3000 K | 0.4212 | 0.3716 |
| 3500 K | 0.3980 | 0.3710 |
| 4100 K | 0.3773 | 0.3788 |
| 5000 K | 0.3458 | 0.3628 |
| 6500 K | 0.3114 | 0.3389 |

As seen in FIG. 6, and defined in Table III, the "White Line" 604 (sometimes also called the "white-body line" (WBL), "white-body curve", or "white-body locus") is slightly above the blackbody curve 602 at high color temperatures (e.g., above 4000 K), but is below the blackbody curve at lower color temperatures. Studies indicate that illumination on the WBL 604 may correspond to human perception of what is "white" light. The WBL is proposed for a wide range of color temperatures, but for color temperatures between about 2700 K and about 3000 K (i.e., warm-white, having CCT values that consumers often prefer), the WBL is about 0.010 Duv below the blackbody locus, wherein Duv represents the distance from the blackbody locus in the 1976 CIELUV chromaticity space.

The following equation is scaled to provide a Whiteness metric for any color point having CCT between about 2700 K and about 3000 K. This Whiteness metric will be zero, or substantially 0, for any point on the Planckian locus, and will be unity (substantially 1) for any point on the WBL:

$$\text{Whiteness} = 1 - 100\sqrt{(Duv + 0.010)^2}, \quad \text{Equation (2):}$$

where Duv, for purposes of Equation (2), is the distance of the color point from the Planckian locus in u-v space (note: values below the blackbody line are negative in Equation (1)). For example, for a point at 0.010 below the blackbody, one would insert −0.010 into Equation (2). (For color points having a CCT outside the range of about 2700 K and about 3000 K, the Whiteness can be approximated by inspection of the position of the color point in FIG. 6, without undue experimentation; e.g., if the illumination source has a color point on the "White Line", it will similarly have a Whiteness value of unity). As will be explained in further detail below, LPI increases as the color point of the illumination source approaches the "White Line", and decreases as it moves away in either direction.

As used herein, Color Appearance is a composite measure of color rendering, which is a function of the Net Saturation Value (NSV) of the illumination source (e.g., relatively higher LPI values are obtained for NSV that show an enhanced saturation, but are not overly saturated), and the Hue Distortion Value (HDV); (e.g., relatively higher LPI values are obtained for HDV that show a minimal or zero hue distortion). Both NSV and HDV will be explained in more detail below.

The lighting preference index (LPI) metric was developed using an unbiased selection of test color samples, by selecting an array of colors using the complete database of 1600 corrected Munsell glossy spectral reflectances. These 1600 colors would be understood by the person of ordinary skill in the art, especially in view of M. W. Derhak & R. S. Berns, "Analysis and Correction of the Joensuu Munsell Glossy Spectral Database," Color and Imaging Conference, 2012 (1), 191-194 (2012). Using this array of colors allows for coverage of a significant fraction of color space utilizing the Munsell classification system of hue, value, and chroma.

Figure 7A:
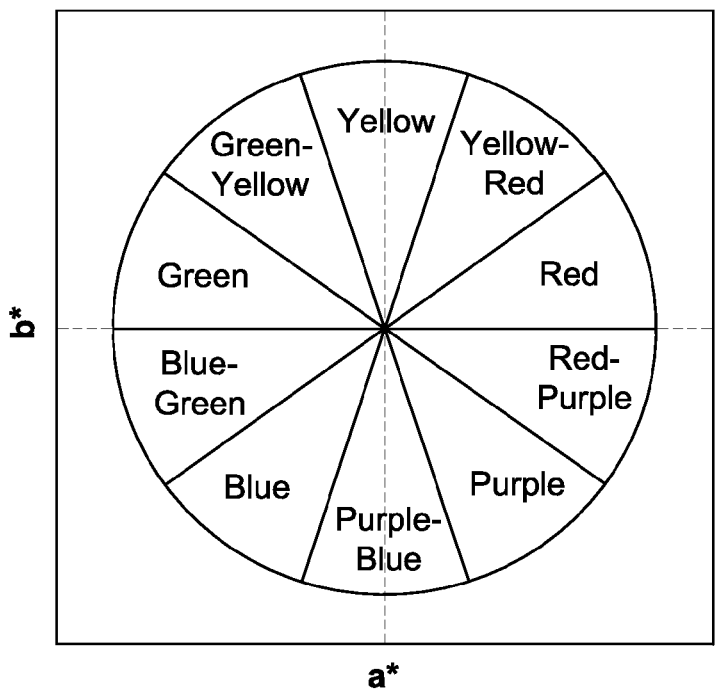
FIG. 7A depicts the 10 categories of hue of the Munsell system.

As also would be understood by those skilled in the field, each color in this array is defined by the Munsell system in terms of its hue (which has 10 categories with 4 subcategories in each, for 40 total items), chroma (ranging from 0 to 16), and value (ranging from 0 to 10). The 10 categories of hue are depicted and labeled in FIG. 7a. All levels of saturation, or chroma, and hue are weighted equally and treated in a statistical count approach, following a similar method as discussed in "Statistical approach to color quality of solid-state lamps," IEEE J. Sel. Top. Quantum Electron, 15(6), 1753 (2009), authors A. Zukauskas, R. Vaicekauskas, F. Ivanauskas, H. Vaitkevicius, P. Vitta, and M. S. Shur.

The color points of all 1600 color samples are calculated, as rendered by both the illumination source (i.e., the test illuminant) and by a CIE reference illuminant, or Planckian radiator, at the same color temperature. The CIE reference illuminant has a spectrum which is determined from the CCT of the illumination source, using Planck's law for blackbody radiation. Planck's law defines radiance of the light source B (in W/sr·m³) as a function of wavelength λ (in meters) and absolute temperature T (in K) as:

$$B_\lambda = \frac{2hc^2}{\lambda^5} \frac{1}{e^{\frac{hc}{\lambda k_B T}} - 1}$$

where h is the Planck constant and $k_B$ is the Boltzmann constant.

Figure 7B:
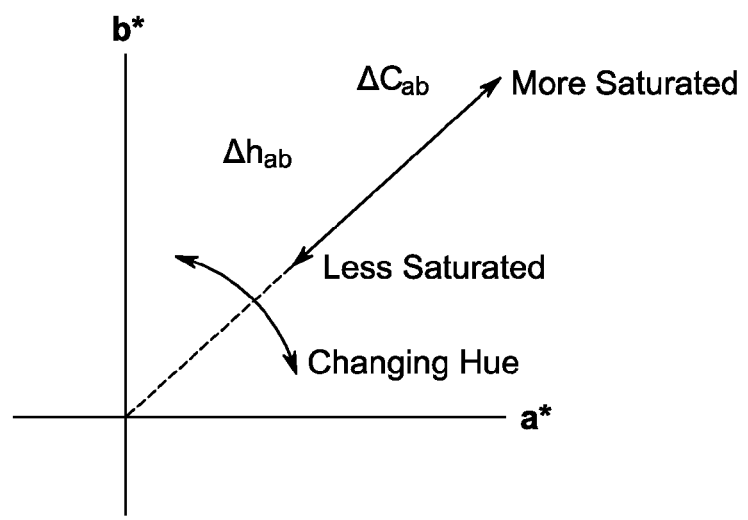
FIG. 7B illustrates the several components contained in a given CRV (color rendition vector).
Figure 7C:
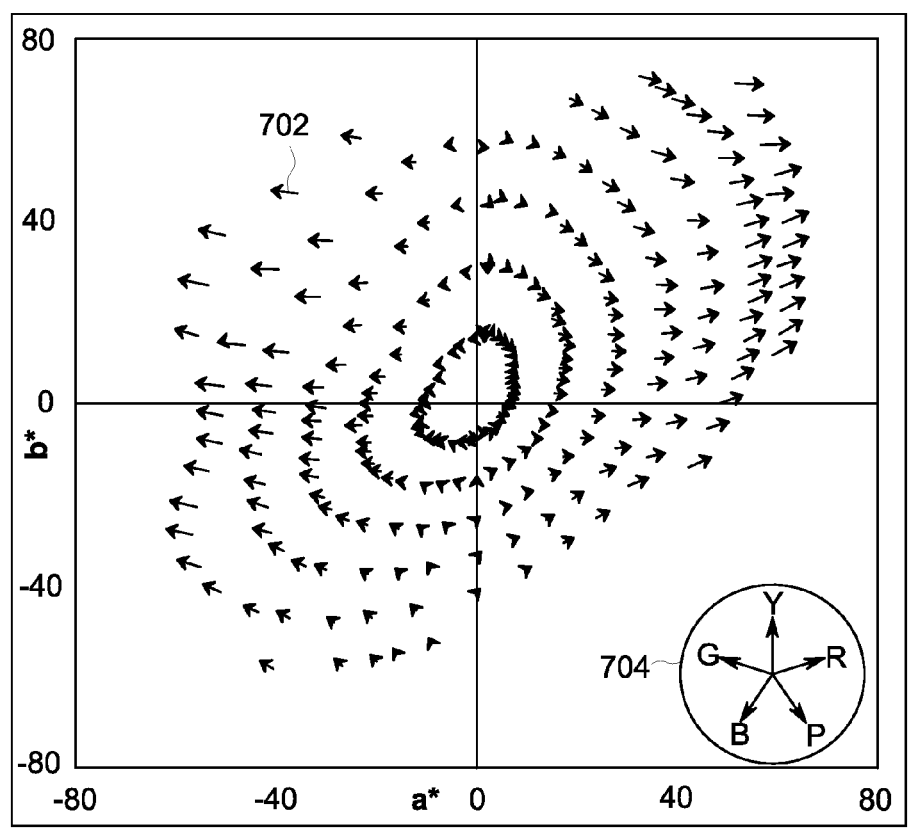
FIG. 7C represents the many color rendition vectors for a neodymium incandescent lamp under a given condition.

All of these color points (also referred to as color coordinates) are then converted to CIELAB color space and color rendition vectors (CRVs) are generated. A CRV is a representation of the magnitude and direction of a color appearance shift with respect to the reference illuminant. FIG. 7b illustrates the components contained in each CRV. The radial component, or $\Delta C_{ab}$, quantifies the shift in chroma, or saturation, where shifts away from the origin signify increases in saturation and shifts toward the origin signify decreases in saturation. The azimuthal component, or $\Delta h_{ab}$, quantifies the change in hue and can be represented by an angular change, in radians. A vector plot of the CRVs at a particular Munsell value can be produced as a visual representation of the color shifts on the a*-b* chromaticity plane. FIG. 7c represents the CRVs 702 at Munsell value 5 for a neodymium incandescent lamp, a product commonly preferred by consumers. As seen in the vector plot, the neodymium lamp produces enhanced saturation, particularly in the red and green components (at the right and left sides, respectively, of the vector plot). The approximate vector directions corresponding to the colors yellow Y, red R, purple P, blue B, and green G, are indicated in the insert 704 of FIG. 7c.

The radial and azimuthal components of each CRV for all 1600 Munsell colors are then determined to quantify the shift in chroma and hue, respectively. With such a large sample size, the magnitude and direction of the CRVs can be represented by statistical counts.

The Net Saturation Value (NSV) represents the percentage of test samples with improved saturation, reduced by the percentage of samples with decreased saturation. Improved levels of saturation are indicated by increases in chroma ($\Delta C_{ab}>0$) beyond a threshold of average perceptual difference, but below an over-saturation limit Decreased saturation levels ($\Delta C_{ab}<0$) are only counted if chroma is reduced beyond the same threshold of average perceptual difference. The average perceptual difference value is based on the following publication: "Evaluation of Uniform Color Spaces Developed after the Adoption of CIELAB and CIELUV", Color Research and Application, volume 19, #2, pp. 105-121 (1994), authors M. Mahy, L. Van Eycken, & A. Oosterlinck, which found the average perceptibility radius to be 2.3 in CIELAB space. For the over-saturation limit, a value of $\Delta C_{ab}=15$ is chosen based on the following publication: "Color Quality Design for Solid State Lighting", Presentation at LEDs 2012, Oct. 11-12, San Diego, Calif. (2012), author Y. Ohno. In this Ohno publication, an increase in preference was found for saturated colors, to a limit, and preference response declined for high levels of saturation. Around a value of approximately $\Delta C_{ab}=15$, the preference response was comparable to no saturation, or $\Delta C_{ab}=0$, with increased preference response in between these two values.

Individual NSV values ($NSV_i$) are calculated for the 10 main hue categories in the Munsell system, and a total NSV is taken as the average over the 10 hues. As used in this disclosure, NSV is defined by Equation (3) and Equation (4):

$$NSV_i=\text{(percent of CRVs in hue } i \text{ with } 2.3<\Delta C_{ab}<15)-\text{(percent of CRVs in hue } i \text{ with } \Delta C_{ab}<-2.3), \quad \text{Equation (3)}$$

$$NSV=\sum_{i=1}^{10} NSV_i/10, \quad \text{Equation (4)}$$

where $\Delta C_{ab}$ is the radial component of the CRV and represents the shift in perceived chroma, or saturation, and i represents the hue category for the 10 main hue categories of the Munsell system. For the region $-2.3<\Delta C_{ab}<2.3$, the change in saturation may not be perceived by a typical observer and is therefore not counted as either improved or worsened.

The Hue Distortion Value (HDV) represents a weighted percentage of test samples that are changing hue. While increased chroma (up to a limit) generally does contribute to attaining relatively higher LPI values, changes in hue are generally undesirable (although changes in hue are a relatively weaker contributory factor to the final LPI value than are chroma changes).

As would be understood by those skilled in the field, the Munsell color system is typically divided into 40 hue subcategories (4 subcategories in each of the 10 main hue categories). To calculate HDV, the percentage of test colors that change to the next hue subcategory, where $\Delta h_{ab}>\pi/20$ radians (or $1/40^{th}$ of a circle), is weighted by the average $\Delta h_{ab}$ value, scaled by the separation between hue sublevels ($\pi/20$ radians). This additional weighting is used to account for very large amounts of hue distortion, where the percentage alone approaches a limit at very high percentage, as nearly all test colors experience hue distortion of surpassing the threshold to be counted. For these calculations, the direction of hue distortion is unimportant, so $\Delta h_{ab}>0$ for distortion in both the clockwise and counterclockwise directions. As with NSV, individual HDV values ($HDV_i$) are calculated for the 10 main hue categories in the Munsell system, and a total HDV is taken as the average over the 10 hues. As used in this disclosure, HDV is defined by Equation (5) and Equation (6):

$$HDV_i = \text{(percent of CRVs in hue } i \text{ with } \Delta h_{ab}>\frac{\pi}{20}) \times \frac{\Delta h_{ab,avg,i}}{\pi/20}, \quad \text{Equation (5)}$$

$$HDV = \sum_{i=1}^{10} HDV_i/10, \quad \text{Equation (6)}$$

where $\Delta h_{ab}$ is the azimuthal component of the CRV and represents the shift in perceived hue, i represents the hue category for the 10 main hue categories of the Munsell system, and $\Delta h_{ab,avg,i}$ is the average $\Delta h_{ab}$ value for all colors within hue i.

Next, the NSV and HDV are merged into a Color Appearance value as per Equation (7):

$$\text{Color Appearance}=(NSV-HDV/2.5)/50 \quad \text{Equation (7):}$$

Note that in Equation (7), the HDV is weighted (i.e., divided by a factor) relative to NSV to provide the best match to observer preference responses. Realistically, the highest value of Color Appearance that is usually attained is about 1, although theoretically it can reach a value of 2, at a NSV=100 and a HDV=0.

Finally, the LPI equation is defined by Equation 8:

$$LPI=100+50\times[0.38\times\text{Whiteness}+0.62\times\text{Color Appearance}], \quad \text{Equation (8):}$$

where Whiteness is defined in Equation (2) and Color Appearance is defined in Equation (7). The parameter of "100" is chosen so that a reference blackbody illuminant scores a baseline value of 100 as with other lighting metrics. The parameter of "50" is chosen in order to scale LPI changes to a similar magnitude as CRI. For example, when using a CRI system, a typical neodymium incandescent lamp may be penalized by about 20 points, having CRI of about 80 relative to CRI=100 for the reference; however, the same neodymium incandescent lamp may be rewarded by about 20 points in the LPI system, having LPI of about 120 relative to LPI=100 for the reference. The weighting factors of 38% Whiteness and 62% Color Appearance have been chosen to provide the best fit to observer preference data. These weighting factors are dependent on the observer set and may be modified in future developments with additional observer preference data, particularly from different demographic or cultural groups. However, this does not diminish the effectiveness of LPI, as presently defined, to quantify and optimize the level of color preference for an observer population having color preferences similar to those of our test population.

An alternative "master" equation for LPI, which is merely a combination of equations (2), (7) and (8), is shown as Equation (9):

$$LPI = 100 + 19 \times [1 - 100\sqrt{(Duv+0.010)^2} + 0.62 \times [NSV - HDV/2.5]] \quad \text{Equation (9):}$$

The purpose of restating LPI in terms of the master equation illustrated above is to show that this index provides a value that the person of ordinary skill in the art can derive from parameters in color science, using the guidance of the present disclosure, without any undue experimentation. The LPI increases with NSV, but decreases as HDV grows. Separately, the LPI increases as Duv approaches that of the "White Line". Realistically, the highest value for LPI that is usually attainable is approximately 150, corresponding to Whiteness=1 and Color Appearance=1; however there is a theoretical maximum of LPI=181, where Whiteness=1 and Color Appearance=2.

In summary, the LPI metric may be determined by the following steps (not necessarily in this order):

(a) Provide the spectrum of the light emitted by the test illuminant as its Spectral Power Distribution (SPD) having 1-2 nm, or finer, precision;

(b) Determine the color point (color temperature and Duv) from the SPD of the test illuminant;

(c) Calculate the Whiteness component from Duv using Equation (2);

(c') Determine the reference spectrum from the color temperature of the test illuminant;

(d') Calculate the color points of all 1600 Munsell colors in the CIELAB color space for both the reference and test illuminants;

(e') Calculate the color rendition vectors for the test illuminant, relative to the reference spectrum;

(f) Calculate the Net Saturation Value and the Hue Distortion Value using Equation (4) and Equation (6), respectively;

(g') Calculate the Color Appearance component using Equation (7); and (d) Merge the Whiteness component from step (c) and the Color Appearance component from step (g') into the LPI using Equation (8).

As used herein, "one or more SSL emitters configured to produce light that appears substantially white" may refer to a variety of modes of achieving white light. In order to produce a color point corresponding to "substantially white" a light source should produce significant amounts of flux in each of the generally blue, green and red portions of the visible spectrum. Although it is common to refer to some phosphors as "yellow", for example a YAG:Ce phosphor, and it is possible to produce a substantially white light source using a "yellow" phosphor excited by a blue or UV-violet LED, it is understood that a yellow phosphor typically comprises a combination of red and green emission, thereby satisfying the requirement of emission in the green and red portions of the visible spectrum. Each of the portions of the spectrum (blue, green, red) may be produced by a direct LED emitter (e.g., a blue LED, or a green LED, or a red LED, or an inherently white LED providing color emitters of different colors from the same semiconductor); or by an energy down-converter, such as a phosphor or quantum dot, or other converter that emits light of a longer wavelength (lower energy) than the excitation light, which may be provided by a UV LED or a violet LED or a blue LED or a green LED. In consideration of SSL emitters other than LEDs, the same combinations of direct emitters and energy converters may be used to produce substantially white light.

For example, the one or more LED light sources configured to produce light that appears substantially white may be selected from at least one of: (1) inherently white light emitting LED; (2) blue LED configured to be radiationally coupled to a yellow phosphor; (3) blue LED configured to be radiationally coupled to a combination of red and green phosphors; (4) UV-violet LED configured to be radiationally coupled to a yellow phosphor; (5) UV-violet LED configured to be radiationally coupled to a combination of red and green phosphors; (6) UV-violet LED configured to be radiationally coupled to a combination of red, green, and blue phosphors; (7) a combination of UV-violet LED and blue LED configured to be radiationally coupled to the same phosphor in a CoB or remote-phosphor arrangement; (8) a class of LED light sources referred to as BSY+R or BSY−R or BSYR ("blue-shifted yellow plus red") comprising a blue LED configured to be radiationally coupled to a blue-shifted yellow phosphor, or a green phosphor, plus a direct-emitting red LED; (9) a variation of a BSY+R light source wherein some or all of the red emission is produced from a narrow red phosphor excited by the blue LED; (10) a combination of red, green and blue LEDs (RGB); (11) a combination of red, green, blue, and one or more additional colored LEDs (e.g., RGBA (amber)) or combinations thereof; or the like. In many of these embodiments for producing white light from an LED chip, the blue LED may comprise a peak emission at a wavelength of greater than or equal to about 425 nm, e.g., at a wavelength of about 425 nm to about 490 nm, e.g., from about 425 nm to about 450 nm, e.g., at about 450 nm. Blue LEDs may comprise surface emitting InGaN/GaN (indium gallium nitride/gallium nitride) based light emitting diode (LED) chips, optionally packaged. In many of these embodiments for producing white light from an LED chip, the UV-violet LED may comprise a peak emission at a wavelength of greater than or equal to about 315 nm, e.g., at a wavelength of about 380 nm to about 420 nm, e.g., from about 400 nm to about 410 nm.

Figure 9A:
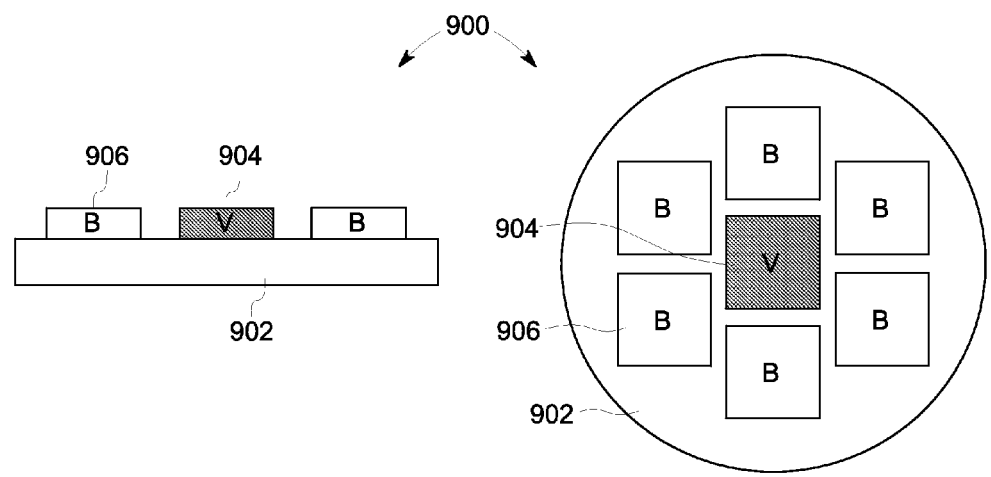
FIGS. 9A, 9B, 9C and 9D set forth schematic views of an arrays in accordance with embodiments of the invention.

FIGS. 9a through 9d set forth highly schematic views of an array of one or more light sources configured to produce light that appears substantially white, and one or more UV-violet light sources. FIG. 9a is intended to be a basic array 900 having at least one UV-violet light source 904 and a plurality (only six are shown here for clarity) of blue or white light sources (configured to produce light that appears substantially white) 906 affixed to a base 902. In this FIG. 9a, light sources 906 may be intrinsically white or may be blue light sources exciting conformally coated phosphors, or may be part of an RGB array. No phosphor separate from the light sources 906 is employed in FIG. 9a.

Figure 9B:
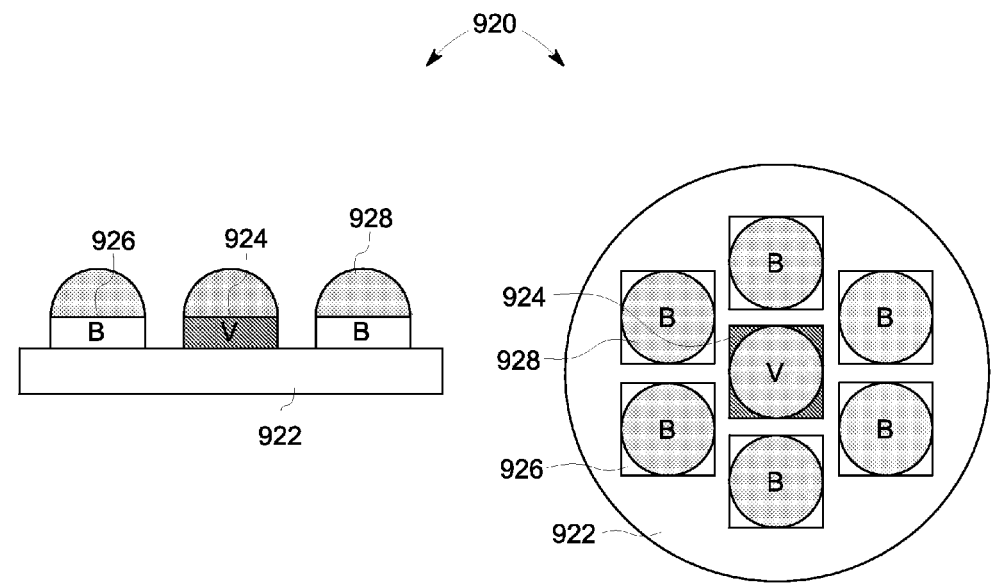

FIG. 9b depicts a schematic array 920 of light sources comprising at least one UV-violet LED chip 924 and a plurality of LEDs 926 configured to emit white light, mounted on PCB 922. The left side of FIG. 9b is a side view, and the right side of FIG. 9b is a plan view. Each of the LEDs 926 is packaged or encapsulated in an encapsulant 928. Encapsulant 928 comprises a phosphor material (not specifically shown) capable of converting the light from the LEDs 926 into substantially white light.

Figure 9C:
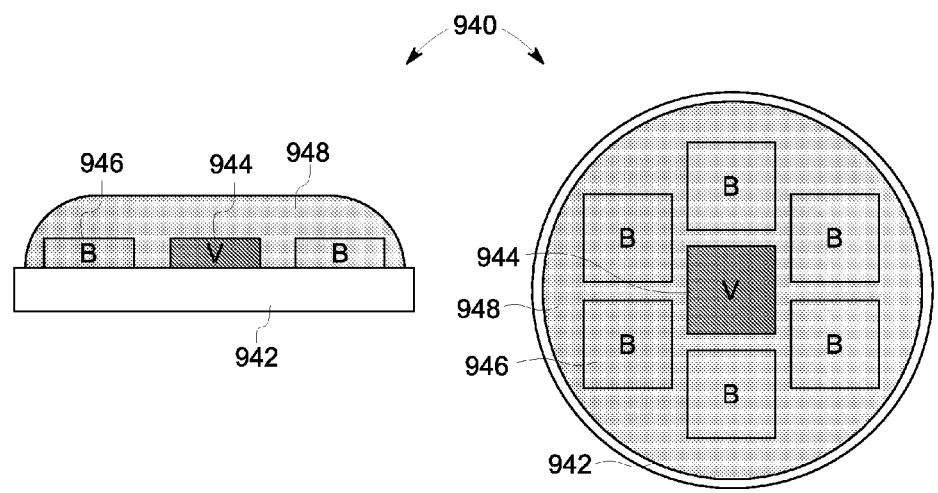

FIG. 9c shows a schematic side view (left) and plan view (right) of a COB array 940 comprising one or more UV-violet LED chip 944, and a plurality of LED chips 946 which can be configured to emit white light. The LEDs are mounted to a board 942. The LEDs are overcoated or overmolded with a phosphor layer 948, which phosphor layer 948 is capable of converting light from LEDs 946 into substantially white light. Typically, phosphor layer 948 is configured to not appreciably absorb light from the one or more UV-violet LED chip 944.

Figure 9D:
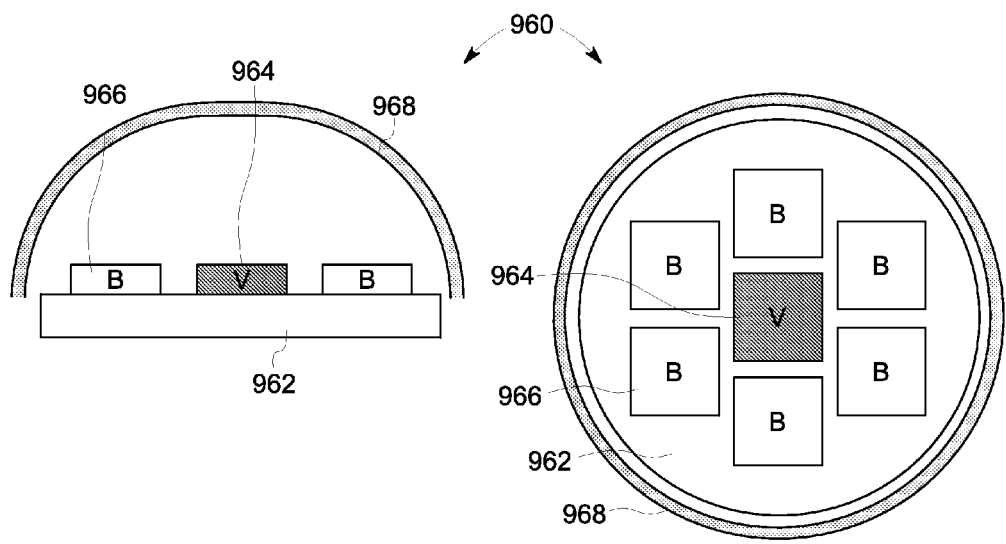
Figure 10E:
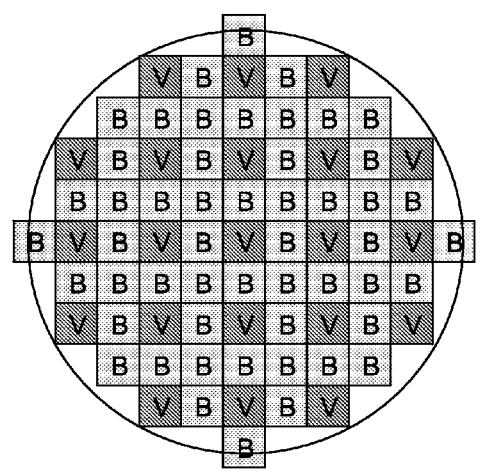
Figure 10F:
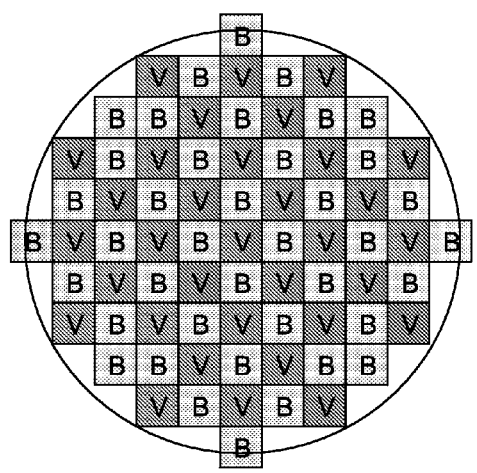

FIG. 9d depicts a schematic view of an array 960 in a remote phosphor configuration. Array 960 comprises a board 962 to which is mounted one or more UV-violet LEDs 964 and a plurality of LED chips 966 which can be configured to emit white light. A phosphor layer 968 is present in a spaced-apart or remote configuration, which phosphor layer 968 is capable of converting light from LEDs 966 into substantially white light. In each of FIGS. 9a to 9d, additional red LEDs may be present, although not specifically shown.

In any of FIGS. 9a-9d, the array may be surrounded by an absorber or color filter (not specifically shown) so that essentially all of the light emitted from the LEDs is filtered by the absorber so that enough yellow light is absorbed to enhance color preference to a level of LPI of about 105 or higher.

Some light engine embodiments may comprise a CoB array comprising both blue LED chips and UV-violet LED chips, radiationally coupled to a phosphor that is conformally coated onto the array of chips so that a significant percentage of both the blue and UV-violet flux is absorbed by the phosphor to produce light having longer wavelengths than the exciting wavelengths, while also allowing sufficient percentage of both the blue and UV-violet flux to bleed through the phosphor to contribute to the substantially white flux emitted from the light engine. Most phosphors used in LED light engines having high absorption and high quantum efficiency when excited by blue light, e.g., at about 450 nm, also exhibit high absorption and high quantum efficiency when excited by UV-violet light, e.g., at about 400-410 nm. By adjusting the ratio of blue LED chips and UV-violet LED chips in the CoB array, along with the composition and thickness of the phosphor, substantially white light can be produced having the desired percentage UV-violet flux to excite the OBA's in white objects, and to achieve the desired color point. This embodiment provides the advantages (1) a single-component lighting module; (2) minimal assembly; (3) avoidance of specialty UV-violet packaged LEDs, resulting in lower cost; (4) extremely small light emitting surface (LES) for directional lighting applications; (5) excellent color-mixing of the UV-violet and blue across the beam distribution in a directional lighting application. An example of possible layouts of the blue LED chips and UV-violet chips in a CoB array are shown in FIG. 10a-10f providing ratios of UV-violet:blue LED chips of about 1%, about 3%, about 5%, about 10%, about 30%, and about 50% (respectively).

If, as is typically the case, the absorption and quantum efficiency of the phosphor are about equal when excited by UV-violet or blue light, then the resulting ratio of UV-violet flux to blue flux emitted by the light source will also be about 1%, about 3%, about 5%, about 10%, about 30%, and about 50%. Depending on the UV-violet wavelength, and the target color point, it is typically found that ratios of UV-violet:blue LED chips of about 10% to about 50% provide the desired level of OBA excitation.

In certain embodiments, as discussed above, an array of LED chips comprising blue LEDs and UV-violet LEDs may be conformally coated with a phosphor, such as a yellow phosphor. It may be a benefit, although not always necessary, to choose "yellow" phosphors that do not substantially absorb the UV-violet light emitted by the UV-violet-emitting LED chip in the light source. Such yellow phosphor may generally be selected to be substantially transparent (e.g., >50% transmittance) to light emitted from the one or more UV-violet LED chips. The technical effect of such selection is to facilitate the light source to exhibit its brightening effect of fluorescent objects. Too much absorption of UV-violet light by a phosphor may inhibit this. This may be especially helpful in an embodiment in which an array of blue and UV-violet LED chips are both overcoated (e.g., conformally overcoated) with one or more phosphor. For example, some suitable yellow phosphors may comprise a phosphor in the YAG or TAG systems. Other yellow phosphors are possible.

As noted above, some embodiments for producing substantially white light may employ a red phosphor. In may be a benefit, although not always necessary, for some red phosphor to be selected to not substantially absorb the UV-violet light emitted by the UV-violet-emitting LED chip in the light source. The technical effect of such selection is to efficiently facilitate conversion of blue light to white light (or white light to red-supplemented white light), without inhibiting the ability of the light source to exhibit its brightening effect of fluorescent objects. In some embodiments, such red phosphor may comprise at least one of a sulfide or nitride, e.g., inorganic sulfide or nitride. It may be beneficial to employ a red phosphor that is selected to be substantially transparent (e.g., >50% transmittance) to light emitted from the one or more UV-violet LED chips. Again, this may be especially helpful in an embodiment in which an array of blue and UV-violet LED chips are overcoated (e.g., conformally overcoated) with one or more phosphor. Some suitable red sulfide phosphors for this disclosure may comprise, e.g., a red Eu-doped alkaline earth metal sulfide phosphor, e.g., (Ca, Sr)S:Eu.

Figure 13A:
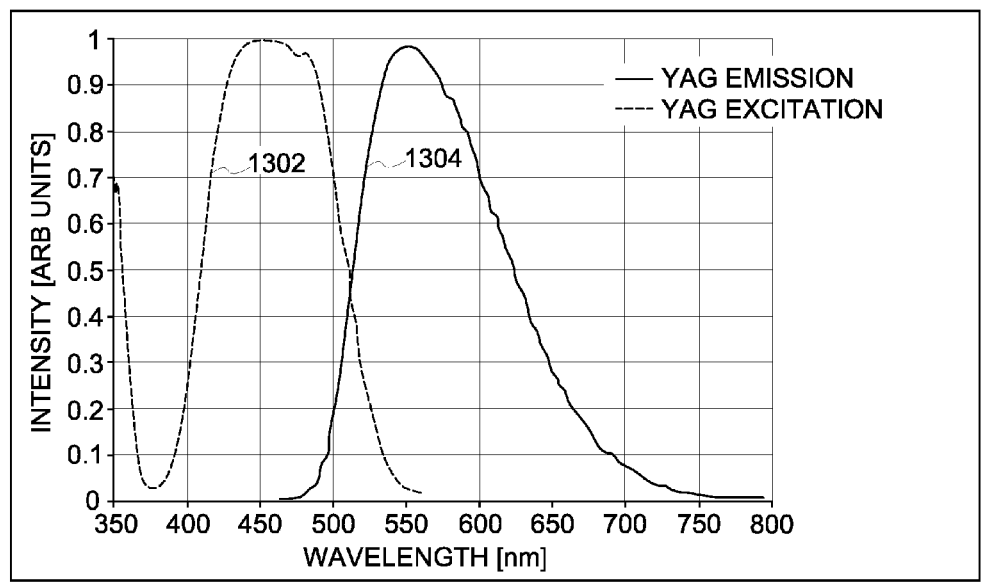
FIG. 13a and FIG. 13b show the typical excitation and emission spectra for typical YAG and nitride phosphors.
Figure 13B:
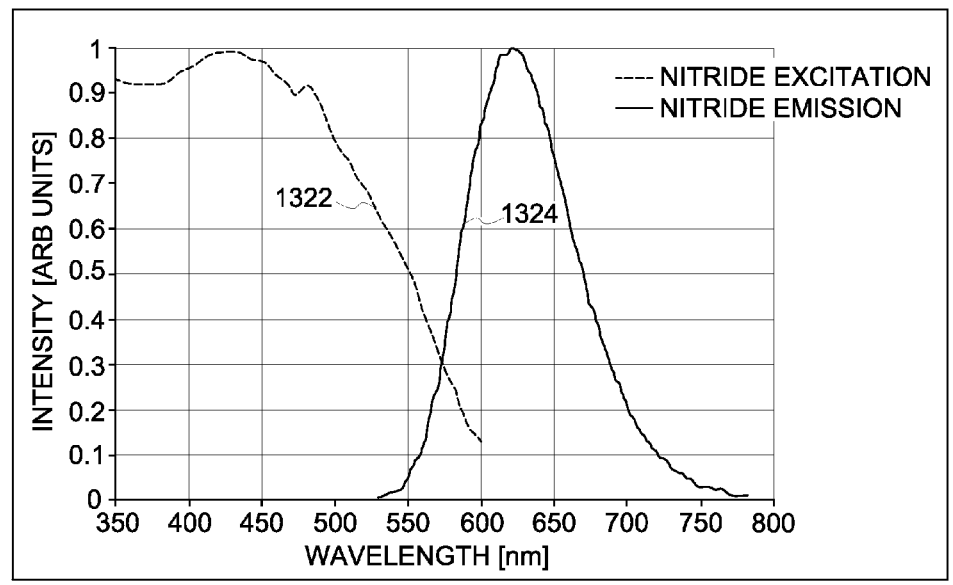

In general, then, it may be beneficialto select phosphors that have relatively low excitation and/or absorption at the emission wavelength for the selected UV-violet component of the light source, in order to maximally utilize the UV-violet intensity for its brightening utility, and to achieve highest system efficiency. It is conventional to employ $Ce^{3+}$ doped garnet phosphors (e.g., YAG:Ce) as a yellow phosphor in LED applications, and to use nitride or oxynitride phosphors as red phosphors in LED applications. The following two figures, FIG. 13a and FIG. 13b show the typical excitation and emission spectra for YAG (i.e., YAG:Ce) and nitride (i.e., $(SrCa)AlSiN_3$:Eu), respectively. As can be seen in FIG. 13a, yellow YAG phosphor has a favorably low amount of absorption of UV radiation in the 350 nm to 400 nm range. The excitation curve is 1302 in FIG. 13a, and the emission curve is 1304 in FIG. 13a. However, the typical nitride red phosphor chosen here, $(SrCa)AlSiN_3$:Eu, has a quite high absorption of UV radiation in the 350 nm to 400 nm range. The excitation curve is 1322 in FIG. 13b and the emission curve is 1324 in FIG. 13b. Therefore, the applicants of the present invention have discerned that one should select phosphors that have relatively low excitation and/or absorption at the emission wavelength for the selected UV-violet component of the light source.

Figure 13C:
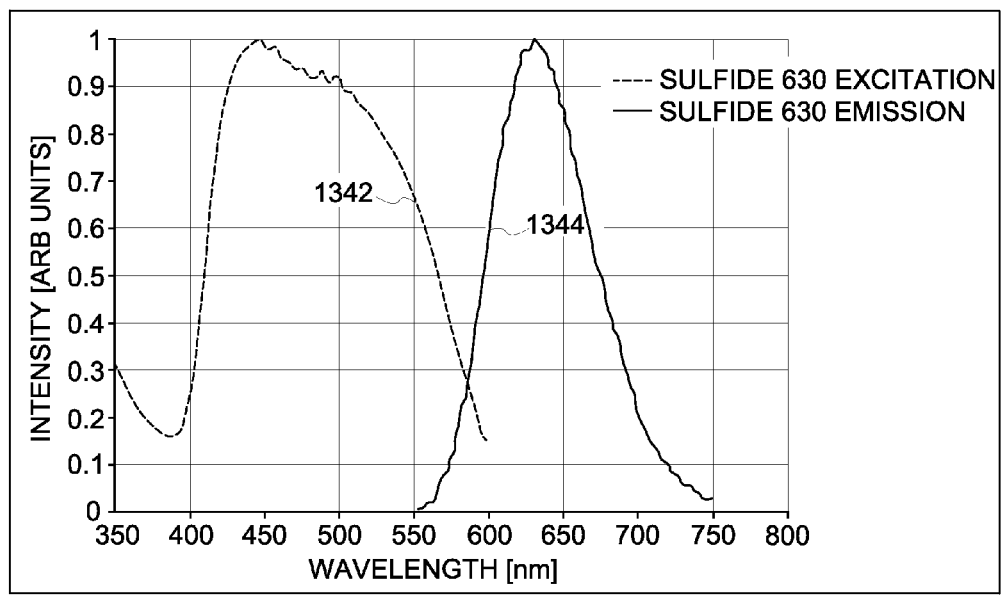
FIG. 13c and FIG. 13d show the excitation and emission spectra for sulfide phosphors
Figure 13D:
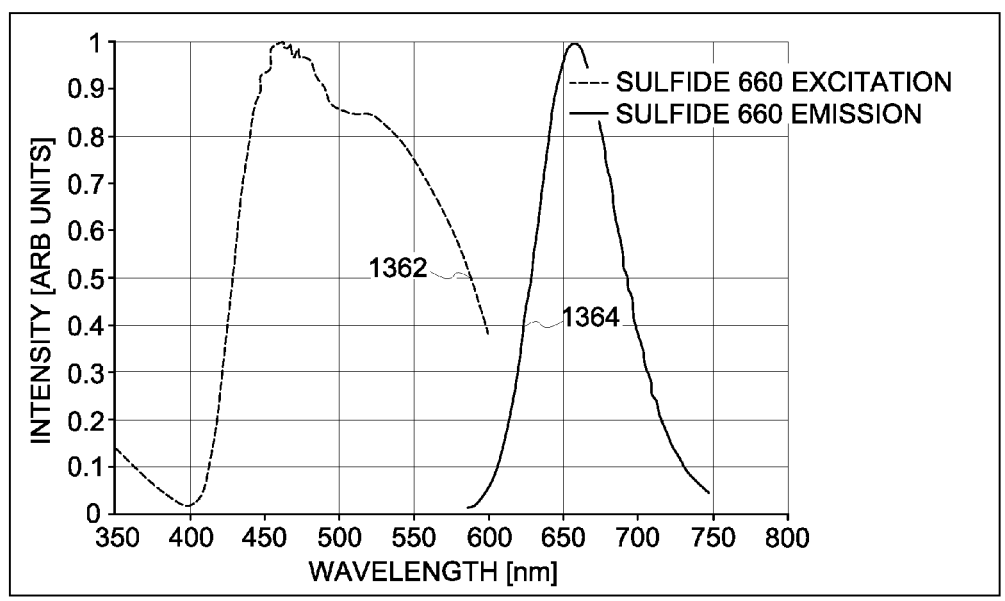

Applicants of the present invention have further ascertained that it is beneficial to choose $Ce^{3+}$ or $Eu^{2+}$-doped sulfide phosphors (e.g., (Ca, Sr)S: Eu (Mitsui R630 N and R 660 N)), which have a quite low quantity of absorption around and under 400 nm, as shown in FIG. 13c and FIG. 13d; thus, sulfide phosphors may be considered as surprisingly good candidates as alternatives for nitride phosphors for use in LED-based light sources that are intended to also emit some UV-violet light. FIG. 13c depicts the excitation curve 1342 for Mitsui R630 N red sulfide phosphor, and its emission curve 1344. FIG. 13d shows the excitation curve 1362 for Mitsui R660 N red sulfide phosphor, and its emission curve 1364.

Other embodiments may employ narrow-band deep-red phosphors, such as phosphors doped with tetravalent manganese (e.g., hexafluorometallates such as $K_2MnF_6$ or $K_2SiF_6:Mn^{4+}$). These may be employed as the sole red phosphor, or in combination with other red phosphors.

In accordance with aspects of this disclosure, a light source may be a lamp that is a directional lamp, such as a lamp configured as a PAR, BR or MR lamp, e.g., a PAR38, BR30, or MR16 lamp. Such directional lamp may be a short neck lamp or a long neck lamp. A directional lamp may be defined in terms of the US Department of Energy—Energy Star Eligibility Criteria for Integral LED Lamps, (draft 3), as a lamp having at least 80% of its light output within a cone angle of 120 degrees (full-width at half-maximum of intensity, FWHM). They may have either broad beam patterns (flood lamps) or narrow beam patterns (e.g., spot lamps), for example having a beam intensity distribution characterized by a FWHM<20°, with some lamp standards specified for angles as small as 6-10° FWHM. Such directed lamp may typically be configured to emit a light beam of less than 15 degrees angular distribution, e.g., less than 10 degrees. Its beam distribution may be substantially Gaussian-shaped.

Typically, a lamp in accordance with aspects of this disclosure may further comprise optical components (e.g., one or more diffuser, lens, waveguide, reflectors, etc.) to distribute, shape, disperse, direct, or focus light, and/or perform other functions to manipulate the light emanating from the light engine. Generally, such optical component may be in optical communication with the light engine. For example, a lamp may further comprise a Fresnel lens in optical communication with the light engine. Many optical components which are intended to transmit visible light (e.g., lenses and diffusers) may comprise resinous materials, such as polymers (e.g., polycarbonate, PMMA, or the like) and/or silicones.

Various types of light diffusion materials are widely known in the art and suitable for use as a light diffuser sheet. In general, a light diffuser sheet is a material that spreads out or scatters incident light to produce a "softer" light Luminit LLC of Torrance, Calif., USA, provides a product line of light diffusing materials that may be suited for use in embodiments of the present invention. It should be appreciated that the present invention is not limited to any particular type or supplier of a light diffuser sheet, and that the products from Luminit LLC are described herein for exemplary purposes only. Those skilled in the art recognize that light diffuser sheets or materials may be selected from a wide variety of available materials as a function of the final desired diffused characteristics of the light emitted by the light engines or lamps in accordance with this disclosure.

Generally, such optical components may comprise optical materials selected to substantially not be degraded by the radiant flux in the UV-violet light wavelength range. That is, it may be generally favorable to choose optical materials for use as optical components that have a resistance to the UV-violet light, since many usual materials can suffer degradation over time. Therefore, optical materials may be selected from materials that substantially do not change in their optical properties upon exposure to UV-violet light over time (e.g., the lifetime of the lamp). More particular, the optical component may comprise a material which is substantially not degraded by light in the wavelength range of about 380 nm to about 425 nm, substantially not degraded by light in the wavelength range of about 350 nm to about 425 nm.

In accordance with some embodiments, many optical materials (other than many reflective materials) in a lamp comprising a light engine may be chosen to be substantially transmissive (e.g., transmitting greater than about 50%) of the radiant flux in the UV-violet light wavelength range, as it is defined above. For example, if the lens or diffuser or other transmissive optical component has too low a transmittance to the radiant flux in the UV-violet light wavelength range, then the optical brightening effect may not occur. Specifically, the optical materials may be substantially transparent or translucent with respect to light in the wavelength range of about 400 nm to about 425 nm, more narrowly, may be substantially transparent or translucent with respect to light in the wavelength range of about 380 nm to about 425 nm, more narrowly, may be substantially transparent or translucent with respect to light in the wavelength range of about 370 nm to about 425 nm. In this context, "substantially transparent or translucent" is intended to comprise at least about 50% transmittance, ore more particularly at least about 90% transmittance. On the other hand, for reflective materials, these usually do not need to have high transmittance for light, although it may be favorable for reflective materials to be able to reflect light in a UV-violet wavelength range, where desired.

In many embodiments, it may be a benefit to select optical materials that may have a transmittance of less than about 10% at all wavelengths below about 350 nm. This can be beneficial to enhance safety, so that little deleterious wavelengths are emitted. Often, the optical material may comprise one or more of a polymer or a vitreous substance or the light. For example, the optical material may comprise silicone or an acrylic, e.g., a PMMA or Plexiglas or ALTUGLAS. Some specific examples of suitable optical materials may include, e.g., Arkema ALTUGLAS V825UVA100 or PLEXIGLAS-Me or PLEXIGLAS-G. In general, then, the optical material should have an absorption spectrum which is similar to or approximates that of Arkema ALTUGLAS V825UVA100.

One exemplary embodiment of a lamp in accordance with this disclosure comprises a light engine which is a chip on board array, in thermal communication with of a heat sink. The light engine may be at the bottom of a reflective cone (e.g., ALANOD), and light from the module is distributed and diffused by a Fresnel lens and a LUMINIT diffuser.

Embodiments of the present disclosure also provide one or more method of making a light source. These embodiments include a method comprising at least the step of conformally coating a phosphor layer over blue LED chips and UV-violet LED chips on an array, the array comprising the UV-violet LED chips and the blue LED chips mounted on a circuit hoard. The phosphor layer may be selected to be substantially transparent to light in a UV-violet wavelength range. Typically, "conformally coating" comprises applying a mixture comprising a resin and a phosphor to the UV-violet LED chips and the blue LED chips. The resin may be, e.g., epoxy or silicone, e.g., low-index silicone, or other polymer material which can be thermally- or UV-curable. In an embodiment, the light transmissive polymer may be selected such that its refractive index is as close to the refractive index of the LED chips as practicable. Typically the coating of the mixture of phosphor and resin may be of a thickness in a range of about 20 to about 200 micron. The weight loading of the at least one phosphor material to resin may typically be in a range 50 to 99 parts per 100. Other weight loading ranges and thicknesses are possible.

Another method embodiment of this disclosure comprises a method for conformally coating a COB array comprising one or more blue LEDs and one or more UV-violet LEDs, with a phosphor layer in such a way that only the blue LEDs are configured to be phosphor converted. Such method comprises mounting a plurality of blue LED chips on a first side of a substantially planar circuit board, and mounting a plurality of UV-violet LED chips on the first side of the circuit board. The upper surface of each of the plurality of UV-violet LED chips is selectively masked by placing a mask. A conformal coating material (e.g., conformal phosphor coating material) is provided to the first side of the board in a manner effective to conformally coat the material onto an upper surface of each of the plurality of blue LED chips, and then removing the mask. Masking may be performed in a variety of ways, including through the use of many known masks, provided that the method is effective to selectively provide a conformal phosphor coating to the blue LED chips and not to the UV-violet LED chips.

EXAMPLE

Figure 11:
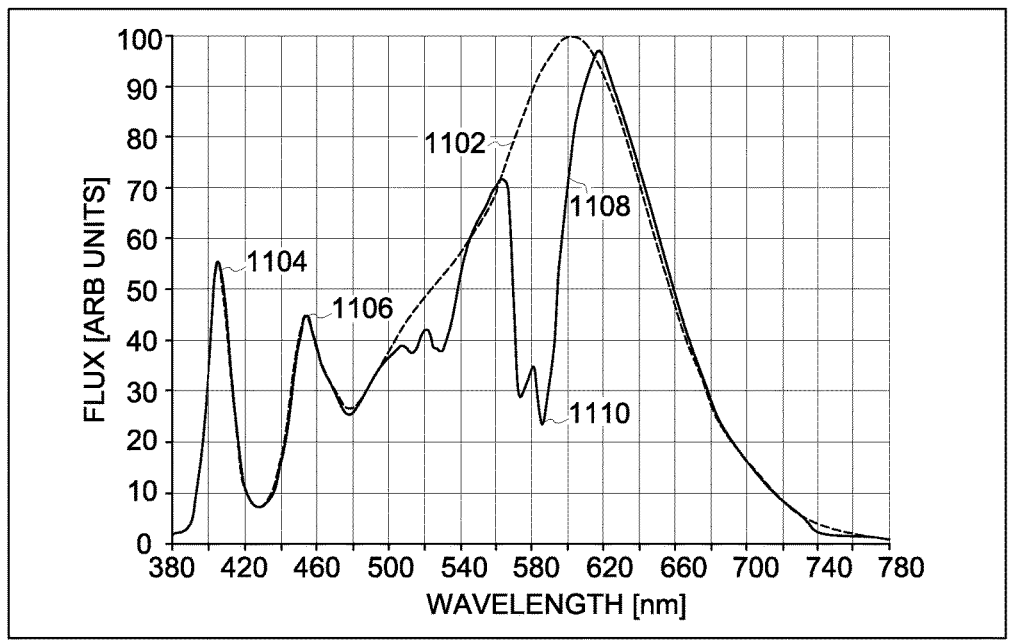
FIG. 11 displays the SPD produced from an exemplary phosphor-converted CoB array comprising 36 UV-violet LED chips having peak wavelength at about 406 nm, and 36 blue LED chips, in accordance with embodiments of the invention.

FIG. 11 displays the SPD 1102 (dotted line) produced from an exemplary CoB array comprising 36 UV-violet LED chips having peak wavelength 1304 at about 406 nm, and 36 blue LED chips having peak wavelength 1106 at about 453 nm. The CoB is uniformly covered by a conformally coated phosphor comprising a yellow-green YAG phosphor and a nitride red phosphor encapsulated in silicone. The light from the array (SPD 1102) comprises about 6% UV-violet flux, and has a composite CCT of about 3111 K, Duv about 0.001, CRI about 84, and LPI about 85. By addition of a yellow absorber surrounding the light engine, comprising Nd-doped glass having about 6% $Nd_2O_3$ by weight and thickness about 0.03 inches (about 0.7 mm), SPD 1108 is obtained having enhanced color preference in addition to about 7% UV-violet flux sufficient for good excitation of OBA's, with CCT of about 3284 K, Duv about −0.003, CRI about 91, and LPI about 109. Portion 1110 of curve 1108 represents a depression in a yellow portion of the spectrum due to the yellow absorber.

Figure 12:
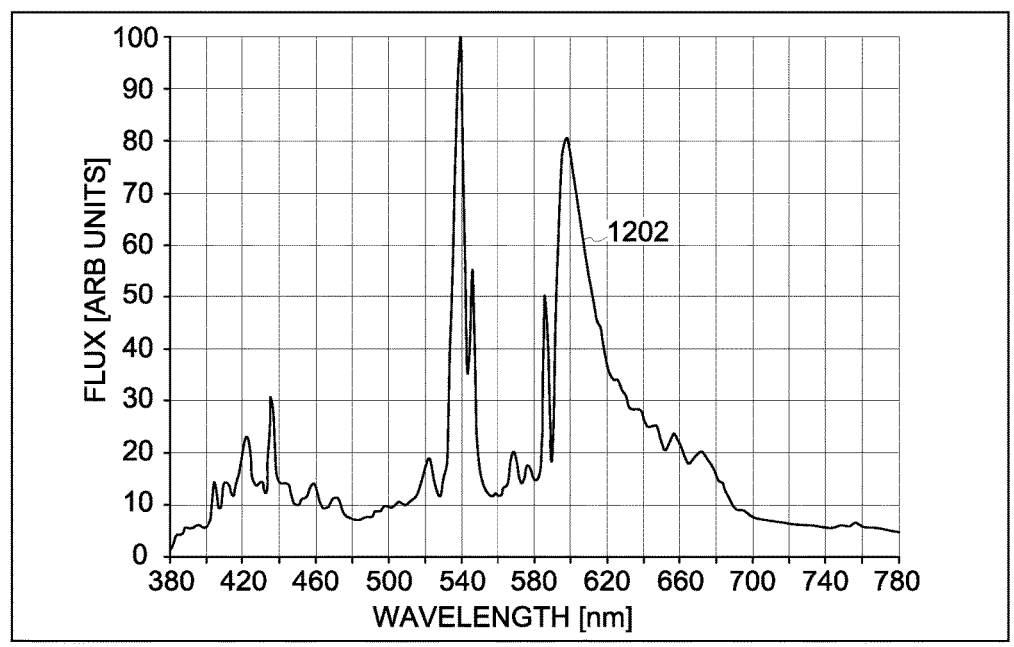
FIG. 12 displays the SPD produced from a prior art ceramic metal halide (CMH) lamp.

A comparison of the color point, CRI, and LPI of the embodiment of FIG. 12 is compared with that of some prior art LED light sources is shown in Table IV below. Although the color points and CRI values of the two prior art LED light sources are very similar to those of this embodiment, the difference in LPI of about 10 points between the prior art and this embodiment has resulted in most observers expressing a very strong preference for this embodiment vs. the prior art in a typical retail merchandise test installation.

In the retail merchandise test installation, a direct side-by-side comparison of illuminated merchandise including white and variously colored garments was made of the embodiment of FIG. 11 vs. an incumbent light source (FIG. 12). The incumbent light source was a low-watt ceramic metal halide (CMH) directional lamp producing the SPD 1202 in FIG. 12 having enhanced color preference in addition to about 5% UV-violet flux (sufficient for good excitation of OBA's), with CCT of about 2950 K, Duv about −0.004, CRI about 87, and LPI about 110. Retail merchants have been reluctant to replace incumbent CMH light sources with LED light sources in spite of the significant LPW and life benefits of LED, and in spite of LED achieving CRI values as high as CMH or higher, because LED light sources typically have been perceived to be unable to replicate the exceptional color enhancement (irrespective of color fidelity) of merchandise and furnishings in the retail environment that is provided by CMH, especially the brightening effect on white objects and the color preference enhancement of a wide range of colored merchandise. The color preference enhancement, as quantified by LPI value of about 110 for CMH, can be understood from the derivation of the LPI metric provided herein (and described in patent application PCT/US2014/054868), as being due to the enhanced net saturation value (NSV) which is primarily driven by the suppression of yellow light in the CMH SPD 1202 of FIG. 12 in the wavelength range from about 550 nm to about 590 nm, similar to the range (1110) of suppressed yellow light in the wavelength range from about 570 nm to about 600 nm of this embodiment as seen in the SPD 1108 in FIG. 11.

TABLE IV

| Light source | Type | CCT | Duv | CRI | LPI |
|---|---|---|---|---|---|
| Blackbody | Reference | 3000 | 0.000 | 100 | 100 |
| FIG. 8a | Prior art LED | 3014 | −0.003 | 90 | 102 |
| FIG. 8b | Prior art LED | 3053 | 0.000 | 92 | 99 |
| FIG. 11, curve 1108 | This invention | 3284 | −0.003 | 91 | 109 |
| FIG. 12 | Incumbent CMH | 2950 | −0.004 | 87 | 110 |

The noted embodiments of this disclosure may provide a solution to the problem of displaying retail items (e.g., linens and/or clothing) with LED lamps in such a manner as to bring out the whitening (e.g., "bluing") fluorescent material already typically present in clothing Use of the lamps, light sources, and methods of the present disclosure may afford the ability to display linens and clothing under energy-efficient LED-based illumination, and may impart an effect to (especially white) clothing, that makes them look cleaner than under illumination by prior art LED lamps.

In the present disclosure, when a layer is described as being "on" or "over" another layer or substrate, it is to be understood that the layers can either be directly contacting each other or have another layer or feature therebetween, unless expressly stated to the contrary. Thus, such terms are simply describing the relative position of the layers to each other and do not necessarily mean "on top of" since relative position above or below depends on the orientation of the device to the viewer.

The above description and/or the accompanying drawings are not meant to imply a fixed order or sequence of steps for any process referred to herein; rather any process may be performed in any order that is practicable, including but not limited to simultaneous performance of steps indicated as sequential.

While the invention has been described in terms of certain embodiments, it is apparent that other forms could be adopted by one skilled in the art. Therefore, the scope of the invention is to be limited only by the following claims.

What is claimed is:
1. A light source comprising:
   a light engine comprising an array of at least one blue LED chip and at least one solid state UV-violet light emitter comprising a peak emission at a wavelength of about 380 nm to about 420 nm, the array coated on at least a portion of an emitting surface thereof with a phosphor composition, the phosphor composition configured to not appreciably absorb light from the at least one solid state UV-violet light emitter, the light source in operation emitting substantially white light having a Lighting Preference Index (LPI) of at least about 105 and comprising a UV-violet flux of at least about 1%.

2. The light source in accordance with claim 1, wherein the UV-violet flux is at least about 5%.

3. The light source in accordance with claim 1, wherein the UV-violet flux is at most about 30%.

4. The light source in accordance with claim 1, wherein the LPI is at least about 110.

5. The light source in accordance with claim 1, wherein the LPI is at most about 145.

6. The light source in accordance with claim 1, wherein the at least one solid state UV-violet light emitter comprises one or more of LED chip, LD chip, inorganic light emitting transistor, organic LET chip, or OLED panel.

7. The light source in accordance with claim 1, wherein the light source is a lighting module comprising a light engine on a supporting structure.

8. The light source in accordance with claim 1, wherein the light source is a lamp and/or luminaire comprising a lighting module.

9. The light source in accordance with claim 1, wherein the light source is a lighting system comprising a plurality of lamps or plurality of luminaires.

10. A light source comprising:

a light engine comprising at least one solid state light SSL emitter, the light engine in operation emitting substantially white light having a Lighting Preference Index (LPI) of at least about 105, wherein the light engine comprises a blue LED in combination with a plurality of encapsulated phosphors, wherein the plurality of encapsulated phosphors comprises at least one yellow or yellow-green phosphor, wherein the plurality of encapsulated phosphors additionally comprises at least one red phosphor, wherein the at least one red phosphor comprises a red phosphor which substantially is not excited by and/or does not absorb UV-violet light, the light source further comprising at least one solid state UV-violet emitter.

11. The light source in accordance with claim 8, wherein the light source is a directional lamp, said directional lamp comprising:

a reflective or refractive beam forming optic;

the light engine in optical communication with the beam forming optic, the phosphor composition comprising at least one yellow or yellow-green phosphor and at least one red phosphor; and a yellow-absorbing color filter for color filtering a radiant flux from the light engine.

12. The directional lamp in accordance with claim 11, further comprising a lens in optical communication with the light engine.

13. The directional lamp in accordance with claim 11, wherein the UV-violet flux is at from about 5% to about 10%.

14. The light source in accordance with claim 1, wherein the phosphor composition comprises a red phosphor substantially transparent to light emitted from the at least one solid state UV-violet light emitter.

15. The light source in accordance with claim 14, wherein the red phosphor has greater than 50% transmittance to light emitted from the at least one solid state UV-violet light emitter.

16. The light source in accordance with claim 1, wherein the phosphor composition comprises a yellow phosphor that does not substantially absorb the UV-violet light emitted by the at least one solid state UV-violet light emitter.

17. The light source in accordance with claim 16, wherein the yellow phosphor has greater than 50% transmittance to light emitted from the at least one solid state UV-violet light emitter.

* * * * *